US008538605B1

(12) United States Patent
Riley

(10) Patent No.: US 8,538,605 B1
(45) Date of Patent: Sep. 17, 2013

(54) STEERABLE PALLET RANGE EXTENSION

(75) Inventor: David Ray Riley, Chesterfield, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/471,903

(22) Filed: May 15, 2012

(51) Int. Cl.
  G01C 23/00 (2006.01)
  F41G 7/00 (2006.01)
  F42B 10/00 (2006.01)

(52) U.S. Cl.
  USPC .................................. 701/3; 244/3.1; 244/3.3

(58) Field of Classification Search
  USPC ........................................ 701/3; 244/3.1, 3.3
  See application file for complete search history.

(56) References Cited

U.S. PATENT DOCUMENTS

| | | | |
|---|---|---|---|
| 6,056,237 | A | 5/2000 | Woodland |
| 6,889,123 | B2 | 5/2005 | Wittenberg |
| 7,059,570 | B2 | 6/2006 | Strong |
| 2010/0065288 | A1 | 3/2010 | Akcasu |
| 2012/0104151 | A1* | 5/2012 | Mccann .......................... 244/13 |
| 2013/0048787 | A1* | 2/2013 | Riley et al. ................. 244/137.1 |

OTHER PUBLICATIONS

Noetscher et al., "Instrumentation for the Assessment of Parafoil Performance," 18th AIAA Aerodynamic Decelerator Systems Technology Conference and Seminar, AIAA 2005-1611; Munich; Germany; May 23-26, 2005. pp. 1-8. 2005.
Benney et al., "The Joint Precision Airdrop System Advanced Concept Technology Demonstration," 18th AIAA Aerodynamic Decelerator Systems Technology Conference and Seminar, AIAA 2005-1601; Munich; Germany; May 23-26, 2005. pp. 1-8. 2005.
McGrath et al., "Status of the Development of an Autonomously Guided Precision Cargo Aerial Delivery System," 18th AIAA Aerodynamic Decelerator Systems Technology Conference and Seminar, AIAA 2005-1625; Munich; Germany; May 23-26, 2005. pp. 1-8. 2005.
Berland et al., "Development of a Low Cost 10,000 lb Capacity Ram-Air Parachute, Dragonfly Program," 18th AIAA Aerodynamic Decelerator Systems Technology Conference and Seminar, AIAA 2005-1626; Munich; Germany; May 23-26, 2005. pp. 1-8. 2005.
Carter et al., "Autonomous Guidance, Navigation, and Control of Large Parafoils," The Draper Technology Digest, vol. 10, 2006, pp. 14-25.
Gilles et al., "Flight Testing of a Low-Cost Precision Aerial Delivery System," 18th AIAA Aerodynamic Decelerator Systems Technology Conference and Seminar, AIAA 2005-1651; Munich; Germany; May 23-26, 2005. pp. 1-8. 2005.

(Continued)

Primary Examiner — Thomas Black
Assistant Examiner — Tyler Paige
(74) Attorney, Agent, or Firm — Hope Baldauff, LLC

(57) ABSTRACT

A steerable container delivery system ("CDS") includes a pallet configured with a pallet steering mechanism and a range extension device for steering a CDS cargo bundle during free fall when airdropped. The pallet steering mechanism and range extension device may be inflated shortly after deployment using compressed air carried by an air tank in the pallet. A flight management computer ("FMS") continuously monitors the location of the CDS bundle using GPS technology and determines a vector to a drop location based on stored GPS measurements. The FMC continuously monitors and positions the CDS bundle over the drop location, and is able to independently control the position of the CDS bundle, either by rotating the CDS bundle or moving it laterally. At the appropriate altitude, the FMC causes the main parachute to open to slow the descent of the CDS bundle for impact.

20 Claims, 16 Drawing Sheets

(56) References Cited

OTHER PUBLICATIONS

McHugh et al., "Planning, Execution, and Results of the Precision Airdrop Technology Conference and Demonstration (2003)," 18th AIAA Aerodynamic Decelerator Systems Technology Conference and Seminar, AIAA 2005-1680; Munich; Germany; May 23-26, 2005. pp. 1-8. 2005.

Hattis et al., "Status of an on-board PC-based airdrop planner demonstration," AIAA Aerodynamic Decelerator Systems Technology Conference and Seminar, 16th, Boston, MA; May 21-24, 2001. pp. 1-11. 2001, Abstract Only.

Hattis et al., "An In-Flight Precision Airdrop Planning System," 23rd Army Science Conference, Dec. 2-5, 2002, Orlando, Florida.

Wright et al., "Precision Drop System," 18th AIAA Aerodynamic Decelerator Systems Technology Conference and Seminar, AIAA 2005-1644; Munich; Germany; May 23-26, 2005. pp. 1-8. 2005.

Kaesemeyer, "Testing of Guided Parafoil Cargo Delivery Systems," 18th AIAA Aerodynamic Decelerator Systems Technology Conference and Seminar; Munich; Germany; May 23-26, 2005. pp. 1-8. 2005.

\* cited by examiner

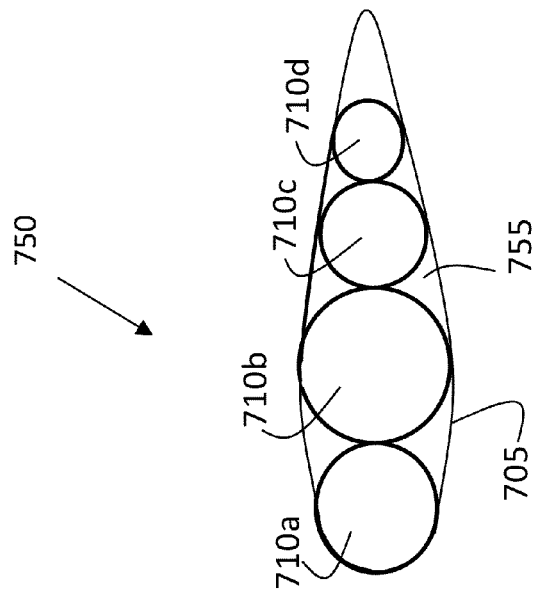
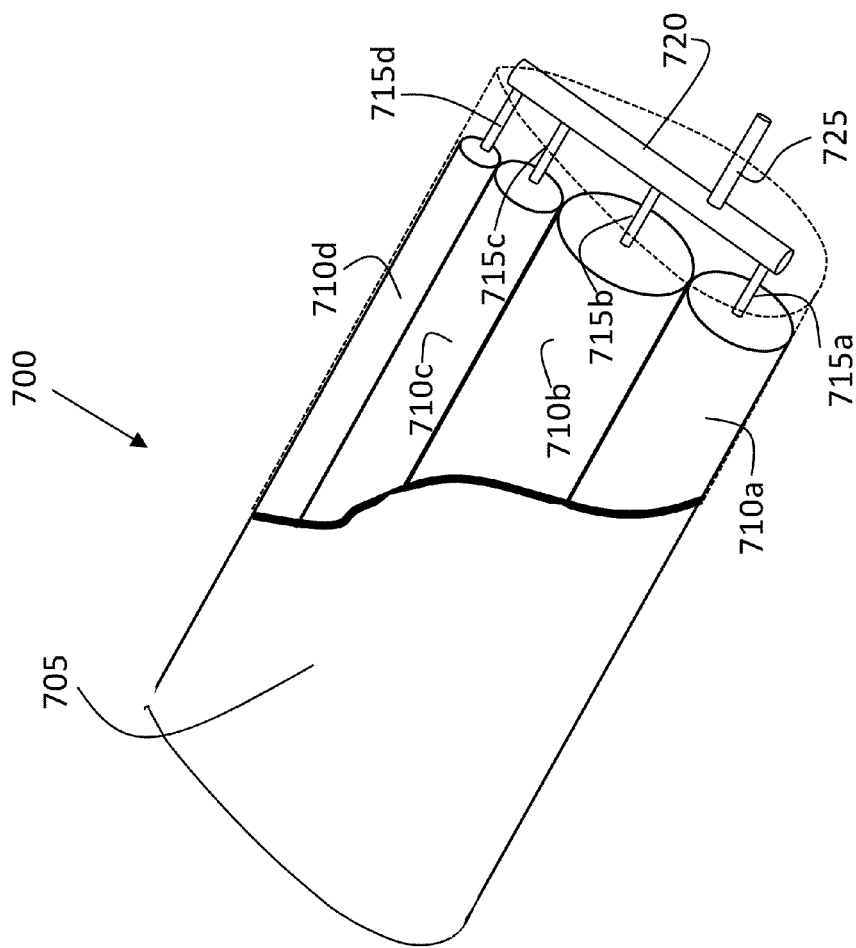
FIG. 7B
FIG. 7A

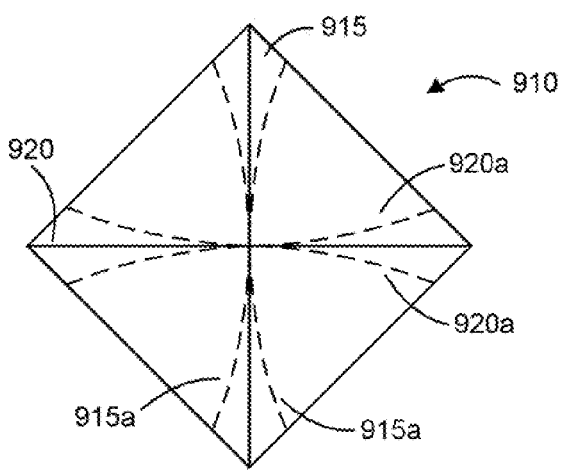
FIG. 9A
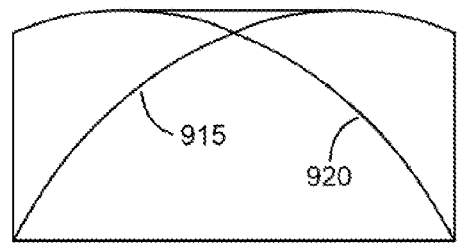
FIG. 9B
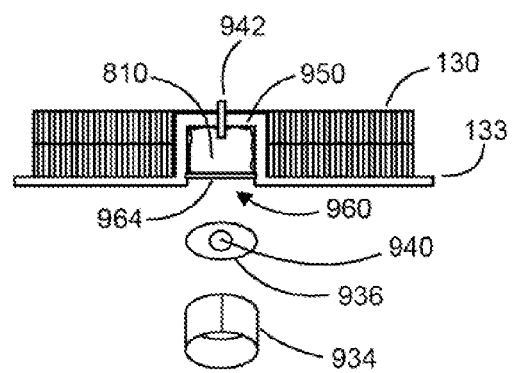
FIG. 9C
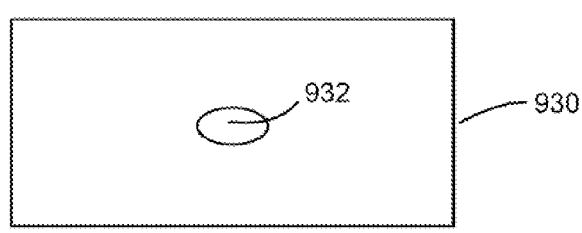
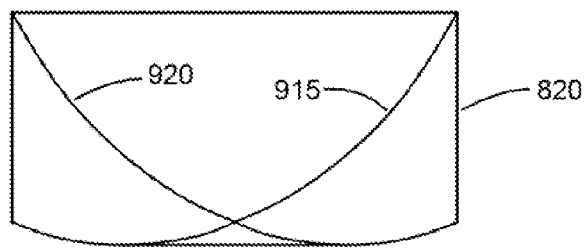

STEERABLE PALLET RANGE EXTENSION

BACKGROUND

Airdropping cargo is a common approach for providing materials or supplies (collectively called "cargo") to remote or hostile areas for supporting military troops. In military applications, airdropping cargo allows resupplying forward areas where ground transport of cargo is not feasible. Airdropping cargo can also be used in non-military applications, such as delivery of emergency or relief supplies. Similarly, cargo aircraft can airdrop cargo in areas where ground transport is not readily possible, or timeliness does not allow for the delay associated with ground transportation of the cargo. While helicopters can also deliver supplies in remote areas, they are often limited as to their payload and their delivery range. Further, they can be more susceptible to ground-to-air attacks.

The accuracy of airdropping cargo has been facilitated by the use of pallet steering mechanisms and global positioning system ("GPS") technology. A pallet steering mechanism may be used to actively steer the cargo as it descends and, GPS technology could be used to guide the delivery of cargo through active steerage of the cargo as it descends.

Cargo is typically bundled and secured to a support base, such as a pallet, skid or similarly blunt flat-bottomed surface, and the blunt or flat bottomed surface is usually the leading side during descent. Aerodynamically, an object that is descending rapidly and has a blunt or flat leading edge has excessive drag. Such an object also tends to have limited cross range capability. It is with respect to these and other considerations that the disclosure herein is presented.

SUMMARY

It should be appreciated that this Summary is provided to introduce a selection of concepts in a simplified form that are further described below in the Detailed Description. This Summary is not intended to be used to limit the scope of the claimed subject matter.

The disclosure is generally directed to a steerable container delivery system ("CDS") that allows an airdropped cargo container to be directed to a specified drop location. This can be accomplished in one embodiment by using fins attached to the CDS that can steer the cargo container to its airdrop location and a range extension device to increase cross range capability.

In one embodiment disclosed herein, a steerable container delivery system ("CDS") includes a pallet configured to be airdropped from a cargo aircraft, and a pallet steering mechanism extending from the pallet and configured to alter a lateral position of the pallet during descent of the CDS. The system further includes a range extension device configured to reduce the glide slope and angle, and increase the range of flight. The system further includes a flight management computer ("FMC") configured to control the pallet steering mechanism, wherein the FMC computer includes a GPS receiver configured to determine the lateral position of the pallet and control the pallet steering mechanism to position the CDS over a drop location.

In one embodiment disclosed herein, a steerable container delivery system ("CDS") includes a pallet configured to be airdropped from a cargo aircraft and a first fin and a second fin positioned at opposite sides of the pallet, and a range extension device positioned on the bottom of the pallet. The first fin and the second fin are configured to be independently rotated on an axis positioned horizontal to the pallet. The system further includes a first actuator and a second actuator configured to rotate the first fin and second fin respectively. The system further includes a flight management computer ("FMC") configured to control the first actuator and the second actuator so as to steer the CDS to a drop location, wherein the FMC includes a memory storing GPS coordinates of the drop location, a wireless interface for receiving the GPS coordinates of the drop location, a GPS receiver configured to receive GPS signals and provide a longitude and latitude of the CDS during descent, and a compass providing a heading of the CDS during descent.

In another embodiment disclosed herein, a method controls the descent of an airdropped container delivery system ("CDS"). The method includes the operation of deploying a CDS comprising a pallet and cargo by ejecting the CDS out of a cargo aircraft. The method further includes the operation of deploying a first fin and a second fin and a range extension device extending from a first side and a second side and a third side, respectively, of the CDS, wherein each fin is configured to rotate independently about an axis parallel to the pallet. The method also includes controlling a first rotation of the first fin and a second rotation of the second fin to steer the CDS to a drop location.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

FIGS. 7A-7B illustrate two views of one embodiment of the steering fin according to one embodiment disclosed herein, FIGS. 9A-9C illustrates components of a steerable container delivery system according to one embodiment disclosed herein.

DETAILED DESCRIPTION

Figure 1:
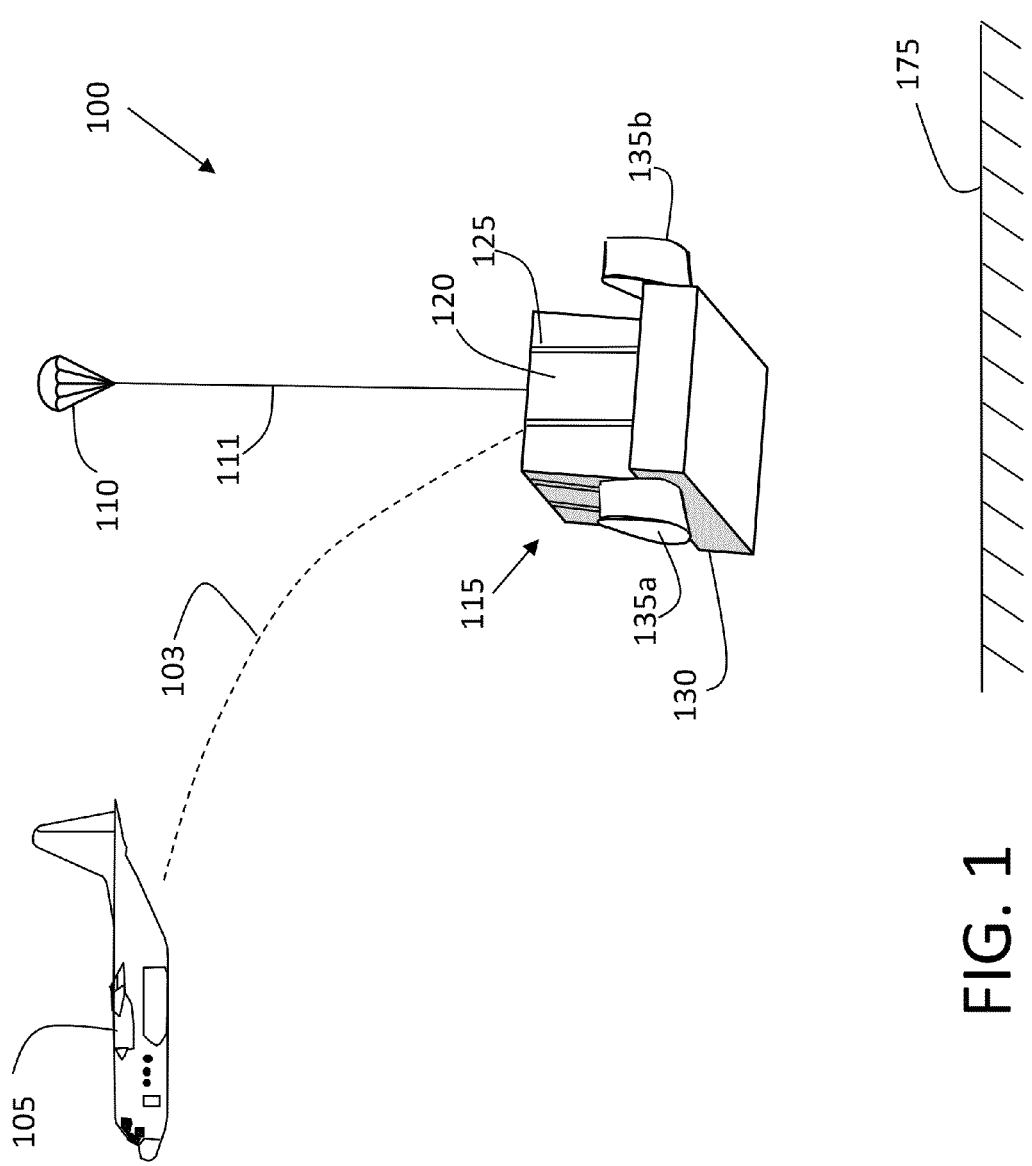
FIG. 1 illustrates one embodiment of an steerable container delivery system according to one embodiment disclosed herein.

The following detailed description is generally directed to a steerable container delivery system ("CDS"). A CDS generally refers to the various components associated with airdropping material or supplies ("cargo") from a cargo aircraft. Although the concepts and technologies disclosed herein are illustrated in the context of delivering supplies for military applications, the technology and concepts can be applied for non-military applications. For example, the technology disclosed herein can be readily adapted to airdropping emergency supplies or relief supplies in remote or drought-stricken areas.

The aircraft involved in an airdrop typically are cargo aircraft designed to airdrop cargo. The aircraft flies a planned route and releases one or more specially packaged cargo containers (termed a "CDS bundle" herein) at a defined location over the drop location. One of the components found on a guided CDS is an on-board computing system that accurately determines the location of the aircraft based on GPS technology. This on-board computing system factors in the aircraft's speed, direction, wind speeds, altitude of the aircraft, and various other factors to indicate the precise time when the CDS bundles should be released to land at the desired location. Although a single CDS bundle may be deployed in an airdrop, typically multiple CDS bundles are deployed. The number of CDS bundles that can be dropped by a single cargo plane varies based on the size and weight of the CDS bundle and the type of cargo aircraft. For context, a large deployment may comprise sixteen bundles, whereas an average deployment may involve four to six CDS bundles.

In one embodiment, the CDS bundles can be approximately 4' in width, 4' in length, and 5' high. They may carry a cargo payload of 1900 pounds. These values are illustrative only, and are provided to give context for describing the concepts herein. Other embodiments can use other sizes and weights.

In one embodiment, the CDS bundle comprises cargo that is strapped to a pallet. At the designated location, the cargo door on the rear of the aircraft is opened, and the pallet(s) are rolled out on wheels incorporated into the floor of the cargo compartment. In one embodiment, an initial chute may be deployed to pull the CDS bundle out of the aircraft. In other embodiments, the plane may increase its pitch so that the CDS bundles roll out more quickly. Any applicable mechanism may be used to separate the CDS bundle from the aircraft. When multiple CDS bundles are deployed, they are serially deployed. Consequently, there is a time period between the first and last CDS exiting the aircraft, which can take several seconds.

During an airdrop, the aircraft may be travelling at 140-150 knots (160-172 mph), although airdrops may occur at greater speeds. At these rates, each second of error can translate into significant deviation from the intended target. It is not uncommon for each second delay to translate into 75 yards (225 feet) on the ground. In a mountainous terrain, a horizontal distance of 75 yards can involve a significant distance from the intended location to retrieve the cargo. Further, winds may be present at various altitudes that can further disperse the CDS bundles, or otherwise direct a CDS bundle from an intended drop zone.

The accuracy of an airdrop may be facilitated by the aircraft flying slower and at a lower altitude. In a hostile environment, however, the susceptibility of the aircraft to enemy fire increases with the aircraft flying at a lower speed and lower altitude. Therefore, to reduce risk from enemy fire, it may be necessary to fly faster and at a higher altitude, which tends to decrease accuracy of the airdrop. It is not uncommon to airdrop CDS bundles from 20,000 to 25,000 feet.

Consequently, even if the initial CDS bundle is dropped at a precise location to provide the ballistic trajectory to land at the drop location, it can be expected that the last CDS bundle will land at a location distant from the first. Further, it is unlikely that even the first CDS bundle will land at a location within 25 meters of the drop location when relying on a ballistic trajectory from 25,000 feet.

Once the CDS bundle leaves the aircraft, the CDS bundle is in free fall and can fall at rates of 200-320 feet per second depending on various factors, including the atmosphere, which is a function of altitude. Typically, a drogue parachute or a streamer is deployed shortly after the CDS bundle leaves the aircraft. The main purpose of the drogue parachute is to stabilize the orientation of the CDS bundle, and maintain a constant descent dynamic pressure so the fins remain effective as the CDS bundle descends. The CDS bundle is rocked and buffeted by winds during its descent, but the drogue parachute at least ensures that the bottom of the CDS bundle is generally facing down and generally maintains a tilt of less than 12° from level. Without the drogue parachute, the entire CDS bundle could tumble end-over-end during free fall until the main parachute was deployed, and this would risk potential entanglement or malfunction of the main parachute.

During this period of descent, the CDS bundle may encounter cross winds, that provide lateral movement of the CDS bundle. If the wind conditions are known at the various altitudes above the drop zone, it is possible to compensate for this by selecting an appropriate deployment location from the aircraft. However, the wind conditions at various altitudes may not be known. Further, even if the winds conditions are known and taken into account by more precisely identifying a drop location during the aircraft's flight allowing an increase of accuracy of a single ballistic CDS bundle, this would not address the issue of how multiple, serially deployed CDS bundles could land at the same general area in a drop location.

In one embodiment, the CDS bundle comprises an active steering mechanism controlled by a flight control system integrated into the CDS bundle to guide it to the drop location during descent. The flight control system may incorporate GPS technology to provide navigation information used to steer the CDS bundle to the target drop location. Steering the CDS bundle typically occurs during free fall (e.g., when only the drogue parachute is deployed), but can also occur after the main parachute is deployed.

Once the main parachute is deployed, the rate of descent slows and it can be more difficult to direct the CDS bundle to a desired location. Further, the wind has a greater capacity to cause the CDS bundle to drift. Estimating and compensating for wind after the main parachute is deployed can further increase the landing accuracy.

The context of the concepts and technologies presented herein for the steerable CDS system 100 are illustrated in FIG. 1. FIG. 1 illustrates the cargo aircraft 105 airdropping the CDS bundle 115 at a certain location on the flight path. Various computer aided systems on the aircraft may assist the flight crew in determining the appropriate location to drop the cargo based on the aircraft's airspeed, altitude, etc. As will be seen, by being able to steer the CDS bundle during decent, the aircraft has leeway as to when and where the CDS bundle(s) are released.

The CDS bundle is illustrated as falling according to the trajectory of line 103. Once the CDS bundle exits the aircraft, a drogue parachute 110 attached to a tether 111 is deployed. In other embodiments, a streamer can be used in lieu of a drogue parachute. The CDS bundle 115 is stabilized to an extent by the drogue parachute 110. While the drogue parachute introduces drag, its purpose is not so much to slow down the descent of the CDS bundle to an acceptable impact rate, but to ensure that the CDS bundle 115 is oriented properly and not tumbling end-over-end during free-fall. During much of the descent with the drogue parachute, the rate of descent is 200+ feet per second. An acceptable descent rate at impact is 20-30 feet per second. This slower descent rate is accomplished by deploying a main parachute at, for example, 800-1000 feet above the ground 175.

The CDS bundle comprises cargo 120 that is typically secured to the pallet 130 by a series of straps 125 or netting. Although a single monolithic cargo 120 is shown, in other embodiments various sub-layers of cargo may be stacked upon itself, or with intervening layers of crushable cushioning layers. The exact nature of the cargo is not relevant to the concepts present herein.

The pallet 130 itself is also illustrated in FIG. 1 as a single layer, but in some embodiments, as it will be seen, the pallet may comprise several sub-layers. In one embodiment the pallet 130 comprises as a skid sub-layer on the bottom, then a sub-layer (up to two feet thick) of crushable material, and finally a payload platform sub-layer. In some embodiments where the pallet has a steerable control system, various controls and components may be located within the payload platform sub-layer.

The CDS bundle 115 may incorporate various types of steerable mechanisms. In one embodiment, which will be described in further detail below, the steerable mechanisms can comprise two wing-like fin structures 135*a*, 135*b* (collectively referred to as 135) that can guide the delivery of the CDS bundle 115 during free-fall to the drop point 170. In one embodiment, the fins can be inflatable fins, that extend from opposites sides of the pallet. These fin structures 135 may be also controlled by a system incorporating GPS receivers for measuring the instantaneous position of the CDS bundle during descent.

Figure 2:
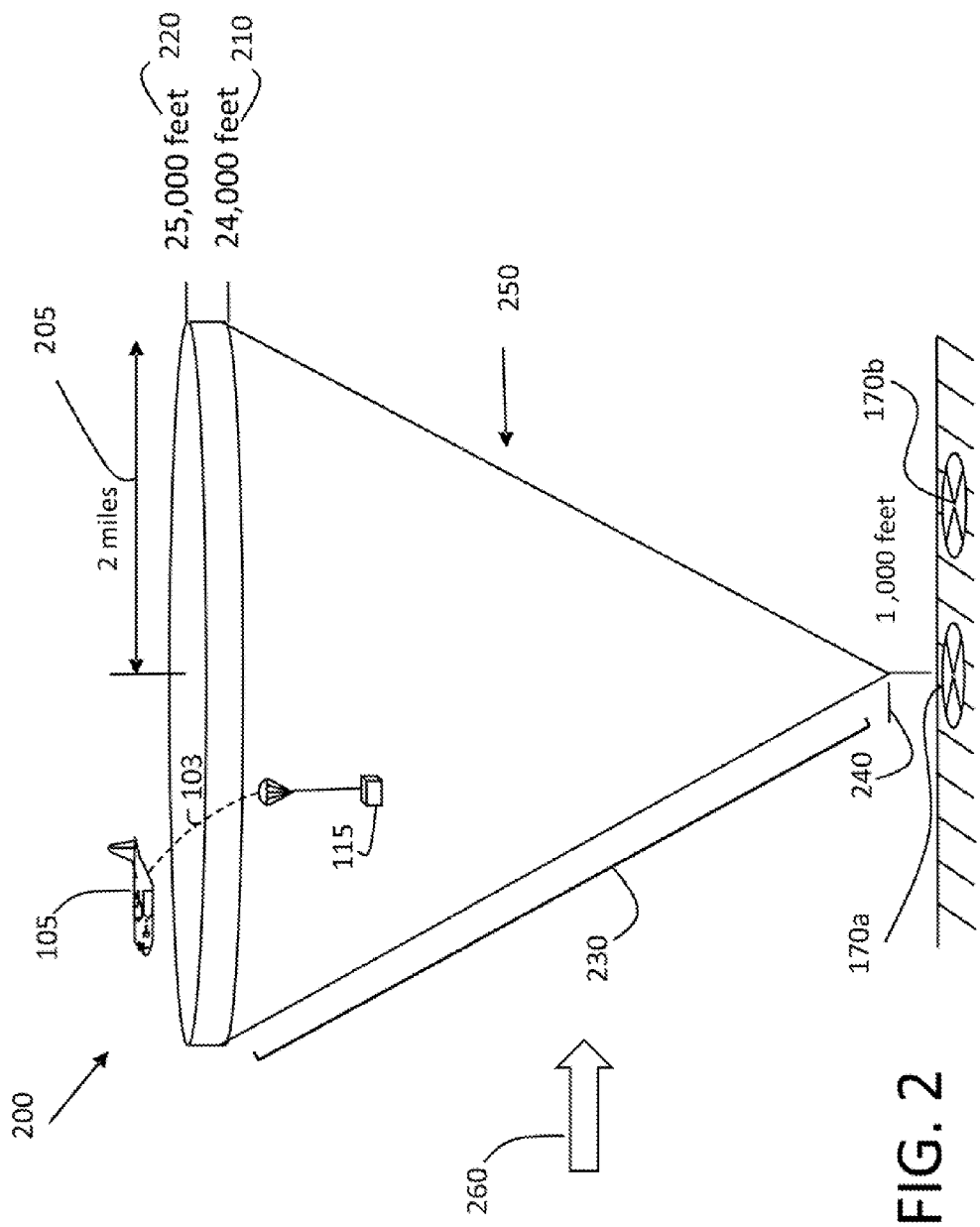
FIG. 2 illustrates an airdrop cone showing when certain operational actions occur during an airdrop according to one embodiment disclosed herein.

Turning to FIG. 2, an airdrop cone 250 is used to illustrate various concepts related to steering the CDS bundle 115. In one embodiment, the cargo aircraft 105 is at 25,000 feet altitude when the CDS bundle 115 is deployed from the aircraft. This corresponds to time t=0. Other drop heights can be used. However, a higher drop height offers not only greater safety from ground fire, but also allows greater latitude in releasing the CDS bundle 115.

The airdrop cone represents an area in which the CDS bundle is able to steer itself to and still be within the bottom of the cone. Being within the bottom of the cone represent being within an acceptable perimeter of an acceptable drop location 170*a*. Thus, at this altitude of 25,000 feet, the acceptable radius 205 of releasing the CDS bundle is approximately 2 statute miles. At this high altitude, there is increased drop time for the CDS bundle to steer itself laterally as appropriate to the bottom of the cone. As the drop altitude is lowered, the descent time decreases and less lateral movement is possible.

The shape of the cone depends not only on the drop altitude, but the prevailing winds 260. The winds may be in the same general direction at different altitudes, but typically the magnitude of the wind will vary based on the altitude. As the wind speeds increase, e.g., increase to over 60 knots, the cone is narrowed or may be distorted. The ability to compensate for winds decreases as the altitude decreases.

The drogue parachute 110 is deployed after the CDS bundle 115 leaves the aircraft, and ensures that the bottom of the pallet 130 is generally pointing down to the ground during free fall. Further, there is additional time for the navigation GPS receivers in the CDS bundle 115 to acquire GPS signals and for flight management computer ("FMC") (not shown in FIG. 2) to initialize the steering mechanisms once it is free fall. During this time, there is no effective steering capability in the CDS bundle 115 and hence this portion is not part of the airdrop cone space. This time equates to approximately 1000 feet descent, so that during that space essentially no active steering occurs from 25,000 feet to 24,000 feet. Thus, the airdrop cone essentially begins at 24,000 feet 210, and not 25,000 feet 220.

During the descent portion 230 wherein steering is relatively effective, the CDS bundle is traveling at a relatively high rate of speed, which can be over 300 feet per second ("fps") at high altitudes and over 200 fps at lower altitudes. During this time, a flight management computer in the pallet 130 ascertains various factors, which may include position, altitude, and wind speed. Based on these inputs, the flight management computer steers the CDS bundle 115 to the bottom of the cone.

At a relatively low altitude, which can be around 1000 feet 240, the CDS bundle 115 may deploy the main parachute, which slows the rate of descent to 20-30 fps. This is termed the "decision altitude." Once the CDS bundle 115 descends at a lower speed, the ability to control or steer the CDS bundle diminishes. Thus, the cone is shown as ending at this point, representing limited steering capabilities at this point.

The FMC is aware of the location of the intended drop location 170*a*. The FMC steers the CDS bundle 115 during descent 230 towards this location. In one embodiment, if there was no wind present, the FMS would steer towards the bottom of the cone that is directly over the drop point 170*a*. Once the main parachute is deployed, then it would descend over the drop point 170*a*.

However, if wind 260 is present between the decision altitude and ground, then the bottom of the cone may be adjusted. During the free fall phase 230, the FMC can monitor its location and determine an offset from the center of the cone if the wind 260 is known.

Generally, the FMC continually steers towards the center of the cone during free call regardless of the prevailing wind speed during free fall. For example, consider two separate scenarios in which the FMC reacts by steering in the same manner. In the first airdrop example, assume that there are no winds at any altitude (even though this may be unlikely). If the CDS bundle is released within the cone, but slightly off the center, the FMC will continually steer towards the center to correct its descent so that it will be at the bottom of the cone at the decision altitude. Typically, the CDS bundle is released from the cargo aircraft at a point so that it will be steered into a headwind while heading to the bottom of the cone.

In a second airdrop example, assume there are prevailing winds, and the CDS bundle is released in the center of the cone, but is laterally blown to one side. Again, the FMC would monitor its location and steer the CDS bundle to the bottom of the cone. The wide radius of the airdrop cone at high altitude facilitates being able to target the bottom of the cone. Further, even if the CDS bundle is not able to target the bottom of the cone due to unusually strong winds, the CDS bundle would likely still be much closer to the desire target location 170*a* than had it been unable to steer at all during descent.

The exact decision altitude can vary based on various conditions, and can be from 800-1000 feet. In other embodiments, it can be more or less depending on conditions, cargo weight, etc. Once the main parachute is deployed, the speed of descent is slowed, and the ability for the FMC to steer the CDS bundle is reduced because of the reduced airspeed over the fins 135. Thus, the impact of winds on accuracy between the decision altitude and ground can be significant, even though the wind speed may be much less than they were at higher altitudes during free fall.

If the wind direction and speed is known at the decision altitude, this may be factored to modify the location of the bottom of the cone. In other words, the target drop location on the ground may be offset relative to the bottom of the cone to compensate for winds as shown by drop location 170b. Positioning the airdrop cone so that the bottom was offset from the drop location 170b in the presence of winds at the decision altitude would allow the drift encountered by the main parachute to position the CDS bundle over to the actual the drop location 170a. The time from deployment at the decision altitude to impact may be 3-4 seconds. If any drift that is encountered is not compensated for, this will be relatively minimal as opposed to a ballistic (e.g., non-steerable) CDS deployment.

Figure 3A:
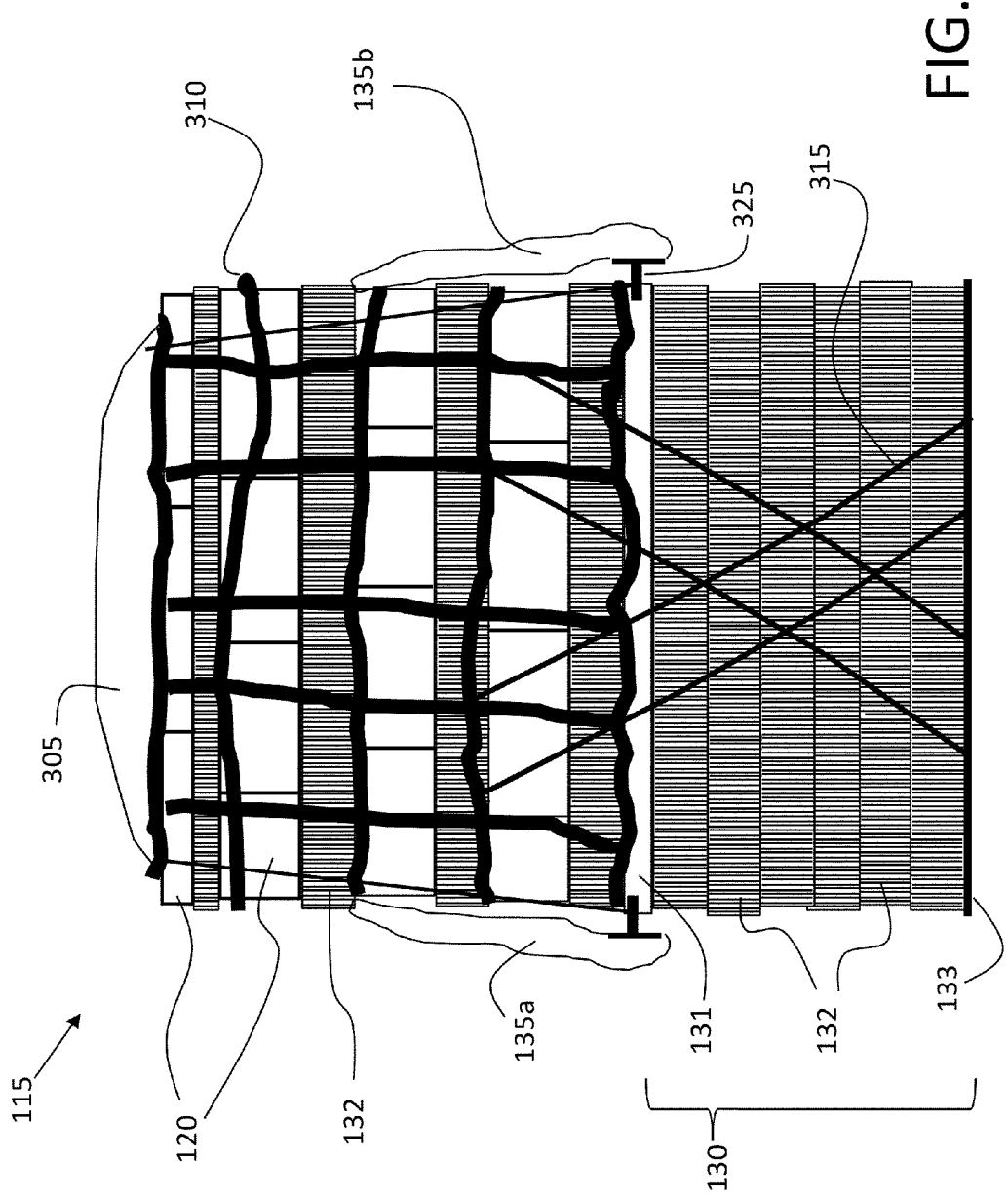
FIGS. 3A and 3B illustrate one embodiment of a container delivery system bundle according to one embodiment disclosed herein.

The CDS bundle 115 is illustrated in further detail in one embodiment in FIG. 3A. The CDS bundle comprises a pallet 130 on which the cargo 120 is placed. The pallet 130 comprises one to two feet of crushable layers 132, which in one embodiment could be made of corrugated cardboard. A bottom layer, or skid 133 provides protection when the CDS bundle is being moved during loading. The payload platform sub-layer 131 is the top layer, and this houses the FMC, power supply, and other related steering components. Intermediate crushable layers 132 may also be interspersed between other layers of cargo 120.

A netting 310 and/or strapping 315 are used to secure the cargo 120 to the pallet 130, as well as secure the parachutes 305 to the pallet 130. The parachutes 305 comprise a drogue parachute and a main parachute and are illustrated as being packed.

As taught herein, the CDS bundle to be airdropped may include a pallet steering mechanism to actively steer the CDS as it descends. A pallet steering mechanism may take various forms and configurations, including a steerable parachute(s), steerable airfoil(s), steerable sail(s), steerable wing(s), steerable fin(s), combinations thereof, and the like. For the purposes of teaching and description, and not limitation, the concepts of a pallet steering mechanism are taught herein with reference to an embodiment having two steerable fins.

The two steerable fins 135a, 135b (collectively referred to as 135) are made of fabric and are inflated using a pressurized gas. The fins 135 illustrated in FIG. 3A are shown in a deflated state at the sides of the CDS bundle 115. The fins 135 can be folded up against the cargo to minimize space. After the CDS bundle 115 is deployed from the aircraft in flight, the fins 135 are inflated and take shape allowing them to be functional. The fins are attached to a fin attachment point 325, which provides two functions. First, it allows the fins to be tilted for steering the CDS container. Second, the fin attachment point allows pressurized gas to be provided to inflate the fins 135.

Figure 3B:
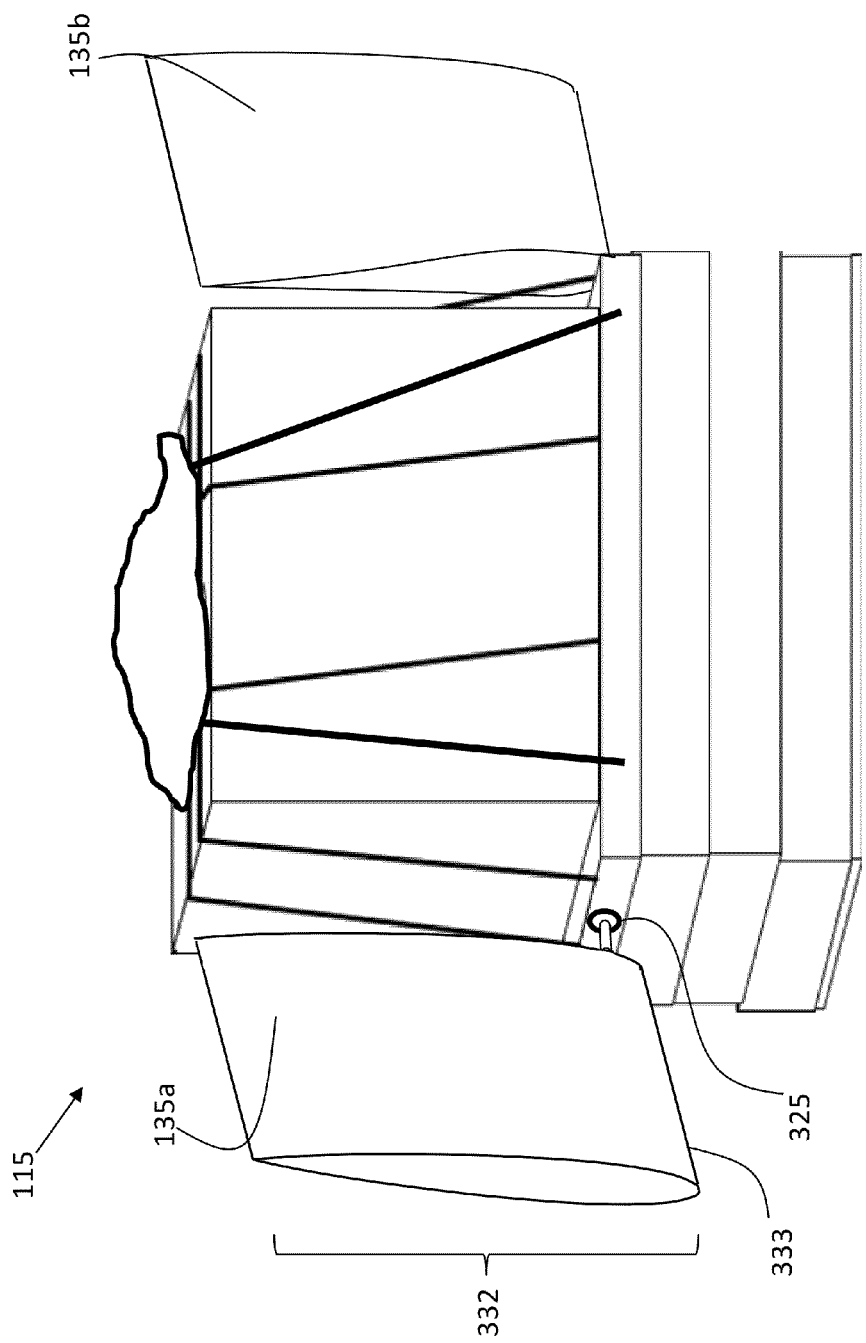

FIG. 3B illustrates the fins 135 in their deployed (inflated) state. FIG. 3B depicts only the nominal aspects of the CDS bundle 115 itself, as the purpose of FIG. 3B is to illustrate the fins as deployed relative to the pallet 130. The fins 135 exhibit a cross-section that can be similar to an airfoil. The fins typically extend out on opposite sides of the pallet, and may extend outwards two or more feet. Different embodiments may have different fin sizes based on the various factors, including the size and weight of the overall CDS bundle 115. The fins rotate about an axis which is parallel to the surface of the pallet, and extends out from opposite sides of the pallet. Each fin 135 can be rotated about the axis on the fin attachment point 325 independently.

The height of the fin 332 is approximately the height of the cargo 120 portion of the CDS bundle as illustrated in FIG. 3B. In one embodiment, the maximum pressure generated by each fin is typically approximately one-fourth of this distance from the leading edge 333 of the fin. The dimensions of the fin can be configured so that the maximum pressure generated by the fin is located above the center of gravity of the CDS bundle 115. Having the maximum pressure above the center of gravity contributes to the stability and controllability of the CDS bundle by the fins during descent. To facilitate this, the angle of rotation of the fins typically pivots about an axis at the payload platform sub-layer 131, as opposed to a lower sub-layer.

Figure 4:
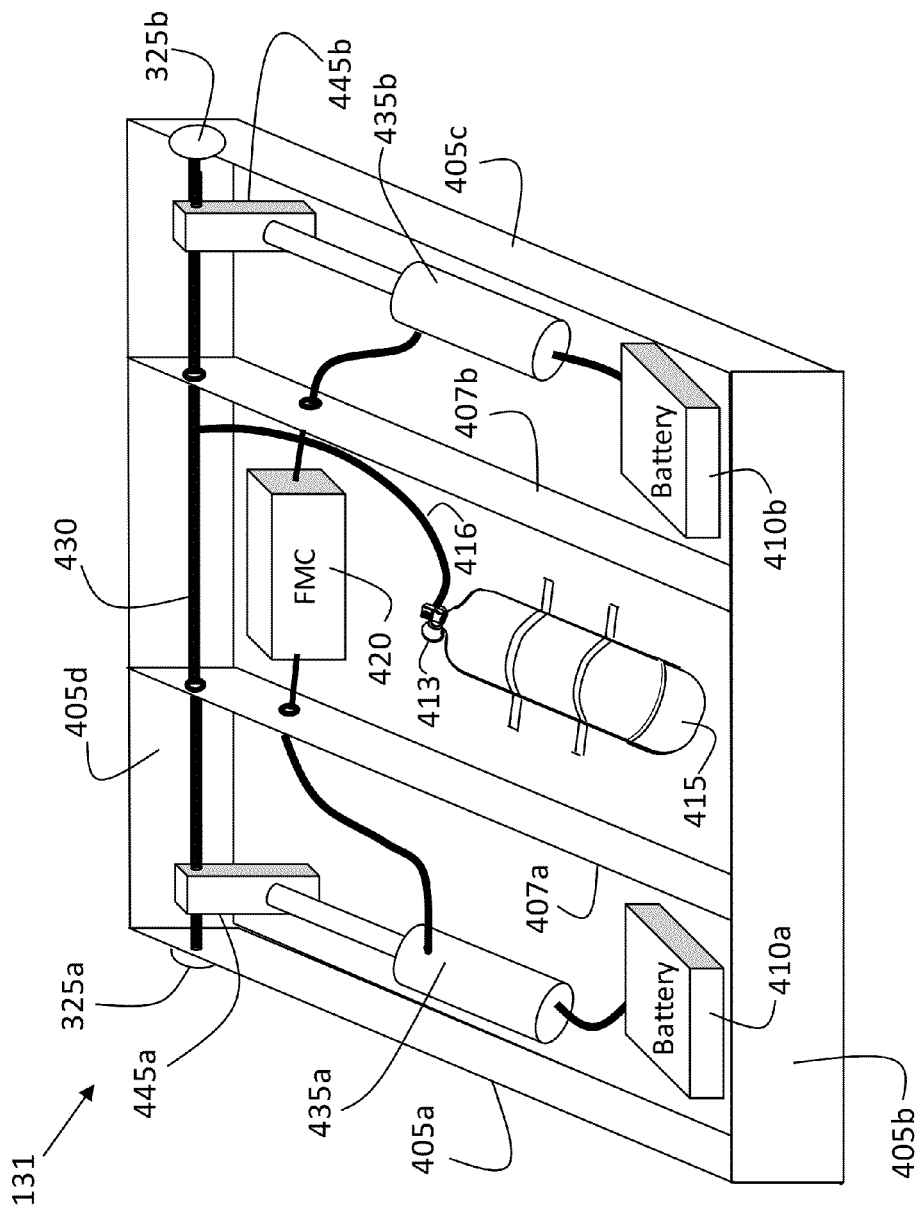
FIG. 4 illustrates components in the platform layer of the pallet according to one embodiment disclosed herein.

FIG. 4 illustrates in further detail the payload platform 131 of the pallet 130. The payload platform can be constructed of plywood, and is compartmentalized for strength. The sides 405a-405d form a perimeter of the payload platform, and internal bulkheads 407a, 407b divide the area inside into several bays.

The payload platform 131 houses a pressurized gas cylinder 415 which contains, for example, pressurized nitrogen or carbon dioxide gas that is released by a regular 413 through a hose 416 to a filler tube 430 which provides the gas to the fins 135 (not shown in FIG. 4). The gas cylinder can be made from metal, fiber wound fiberglass, or other materials. In one embodiment, the tank can be approximately 7"×19" and is pressurized to 3000 pound/per inch. A regulator 413 on the gas tank provides the compressed gas at a defined rate to the fins. Because the fins are inflated at a high altitude where air pressure is low, the fins need to be constantly inflated with gas as the CDS bundle 115 descends in order to maintain a constant air pressure in the fin. As the CDS bundles descends, the outside air pressure increases. The regulator 413 is actuated to release compressed gas upon command from the FMC 420 and thereafter regulates a steady stream of gas. In one embodiment, an electromagnetic actuator punctures a small hole to allow the gas escape. Other types of arrangements in the regulator may incorporate an electromechanical valve to release the gas.

The filler tube 430 functions to channel the gas to the two respective fin attachment points 325a, 325b to which the fins 135a, 135b are attached. Although the filler tube 430 is shown as connected to the two respective gear box assemblies 445a, 445b, the tube is not fixed end-to-end so as to cause one fin attachment point 325a to rotate synchronously with the other fin attachment point 325b. Specifically, the fin attachment points 325a, 325b can rotate independently as controlled by the respective gearbox assembly 445a, 445b, which are powered by the respective actuator 435a, 435b. Those skilled in the art will readily recognize how the gear box assemblies 445a, 445b can be designed to be rotated independently of each other, but yet allow passage of gas from the same filler tube 430.

The payload platform 131 houses the FMC 420 that controls the rotation of the fins by using actuators 435a, 435b (collectively referred to as 435). In one embodiment, the actuators 435 are DC servo motors. Each actuator 435 is connected to a gearbox assembly 445a, 445b (collectively referred to as 445) which can independently rotate the fin attachment points 325a, 325b. Thus, each actuator 435 can independently control the position of the fin 135. Typically, the angle of rotation of the fin is less than 45°.

In another embodiment, the actuators 435 are linear actuators that can push or pull a mechanical linkage arm connected to the appropriate fin. In this way, the actuator can turn each fin 135 independently. Those skilled in the art will recognize that a variety of actuator types and designs can be used to effect independent fin rotation.

Two batteries 410a, 410b are present, and they are used to power the FMC 420 and the actuators 435a, 435b. The battery 410 can be any of the various well known types, including sealed lead acid, lithium, nickel-cadmium, or other type. Although each battery is shown as being connected to a respective actuator 435, each battery can also be connected to the FMC 420.

Although the actuators 435 can be electric motors connected to a gearbox 445 that control the rotation of the fin attachment point 325, other configurations for the actuators are possible. Those skilled in the art will recognize that pneumatically controlled actuators could be used. The compressed gas in the tank 415 could be used as the power source for the pneumatic actuator in lieu of electric motors. A regulator could control the amount of pressurized gas released, and a directional valve could determine the direction of fin rotation. Those skilled in the art will realize that other configurations are possible for controlling the fin rotation, including hydraulically control actuators.

In another embodiment, the actuators 435 are linear actuators that can push or pull a mechanical linkage arm connected to the appropriate fin. In this way, the actuator can turn each fin 135 independently. Those skilled in the art will recognize that a variety of actuator types and designs can be used to effect independent fin rotation.

Figure 5:
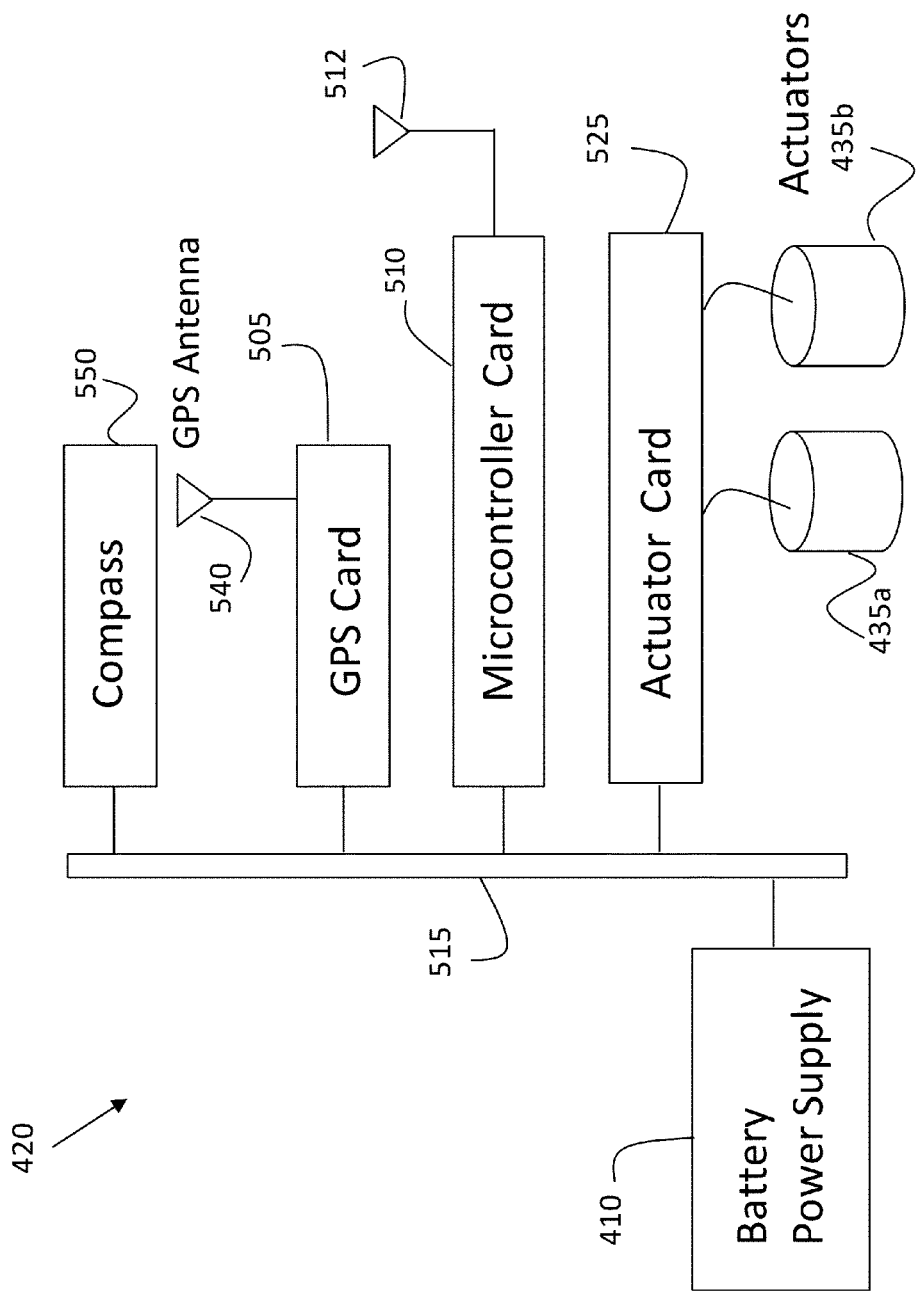
FIG. 5 illustrates one architecture of the flight management computer according to one embodiment disclosed herein.

Further details of the FMC 420 are shown in FIG. 5. Although the battery 410 is considered separate from the FMC 420 in FIG. 4, it is shown in FIG. 5 for completeness. The battery provides power via a bus 515, although direct cabling can be used in other embodiments to provide power to the actuators 435. The bus 515 allows three components 505, 510, and 525 to communicate with each other. The microcontroller 510 provides control to the system, and can comprise a processor, memory, input/output controller, etc. as is well known in the art. In other embodiments, separate components for providing these functions can be used, but a single chip microcontroller (a.k.a. system on a chip) may provide a less expensive and more reliable system.

The microcontroller card 510 receives GPS information from a GPS card 505, which receives GPS signals from a GPS antenna 540. The GPS information provides current longitude, latitude, and altitude information. This location information can be continually monitored and provided to the microcontroller during operation and used by the microcontroller to steer the CDS bundle 115 during descent. The GPS card 505 can be a civilian type GPS card, which provides limited precision relative to a military type GPS card. In other embodiments, the GPS card 505 can be the military type GPS card. In other embodiments, the GPS functionality may be integrated on the microcontroller card 510, or in the microcontroller 510 itself.

The microcontroller 510 may also receive directional signals from a compass 550. The compass can be integrated into the GPS card 505, or may be a separate card, chip, or components. This capability may be present and used for indicating a relative direction for steering the CDS bundle.

The microcontroller card 510 may have a wireless interface along with an associated antenna 512 for receiving data. Typically, the target drop location coordinates are wirelessly programmed into the microcontroller card before the CDS bundle is deployed from the aircraft. Other information may be programmed, such as initial altitude and weight of the CDS bundle may be provided to the microcontroller as well.

Finally, the actuator card 525 provides the control to the actuators 435. Typically, although separate actuators 435a, 435b are used, a single actuator card can control both actuators, or a single actuator can control both fins. In other embodiments, two actuators cards may be used, which are integrated into the actuator.

Those skilled in the art will recognize that various embodiments of the FMC are possible, and that FIG. 5 only illustrates one embodiment. It is possible to use a single board, on which all the functions are integrated, and dispense with the external communications bus 515. Other levels of integration are possible. Other functionality may be incorporated into the FMC, such as inertial navigation units, beacon signal receivers and processors, etc. For example, the functionality of the beacon receiving system as discussed in the aforementioned co-pending application entitled "Precision Airdrop Terminal Seeker" could be incorporated into the FMC 420.

Figure 6A:
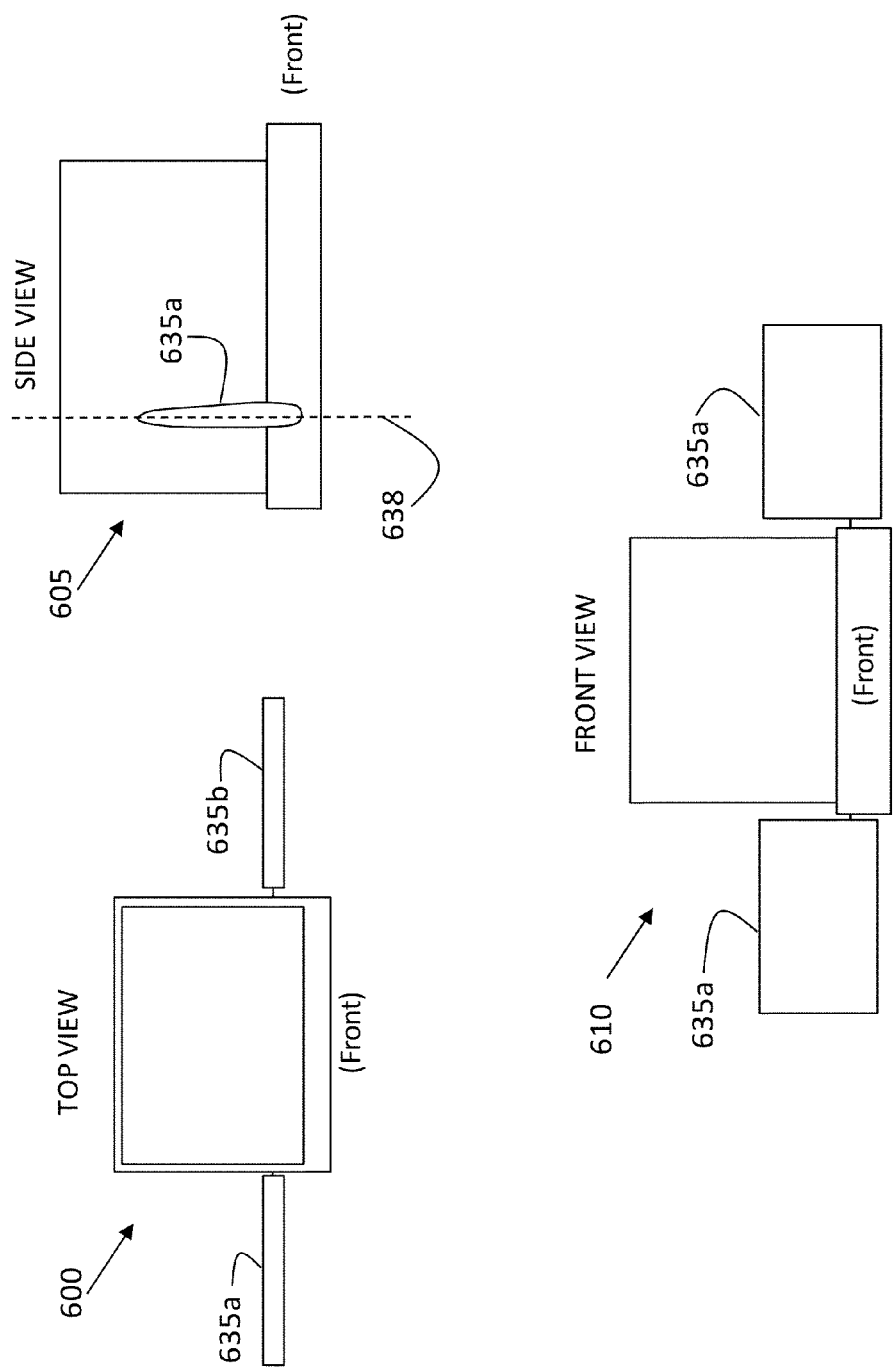
FIGS. 6A-6D illustrate various views of the container delivery system bundle in various configurations according to embodiments disclosed herein.

Turning now to FIGS. 6A-6D, various embodiments of the fin positions are illustrated. Turning to FIG. 6A, a top view 600, side view 605, and front view 610 of the CDS bundle 115 are shown. One side is deemed the front side for facilitating explanation herein. As illustrated by the side view 605, the fin 635a is shown in a vertical position, according to perpendicular reference line 638. Assuming that the CDS bundle 115 is level, the fin 635a is then vertical and does not exert any lateral or rotational force on the CDS bundle. It is expected that the CDS bundle may rock or otherwise be tilted during descent, and the bundle may be at an angle. In such conditions, the fins may have to be rotated to compensate in order to remain in a vertical position. The top view 600 shows both fins 635a, 635b. The width of the fins as seen from above is the same width as the side view 605. The front view 610 shows the sides of the fins 635a, 635b.

Figure 6B:
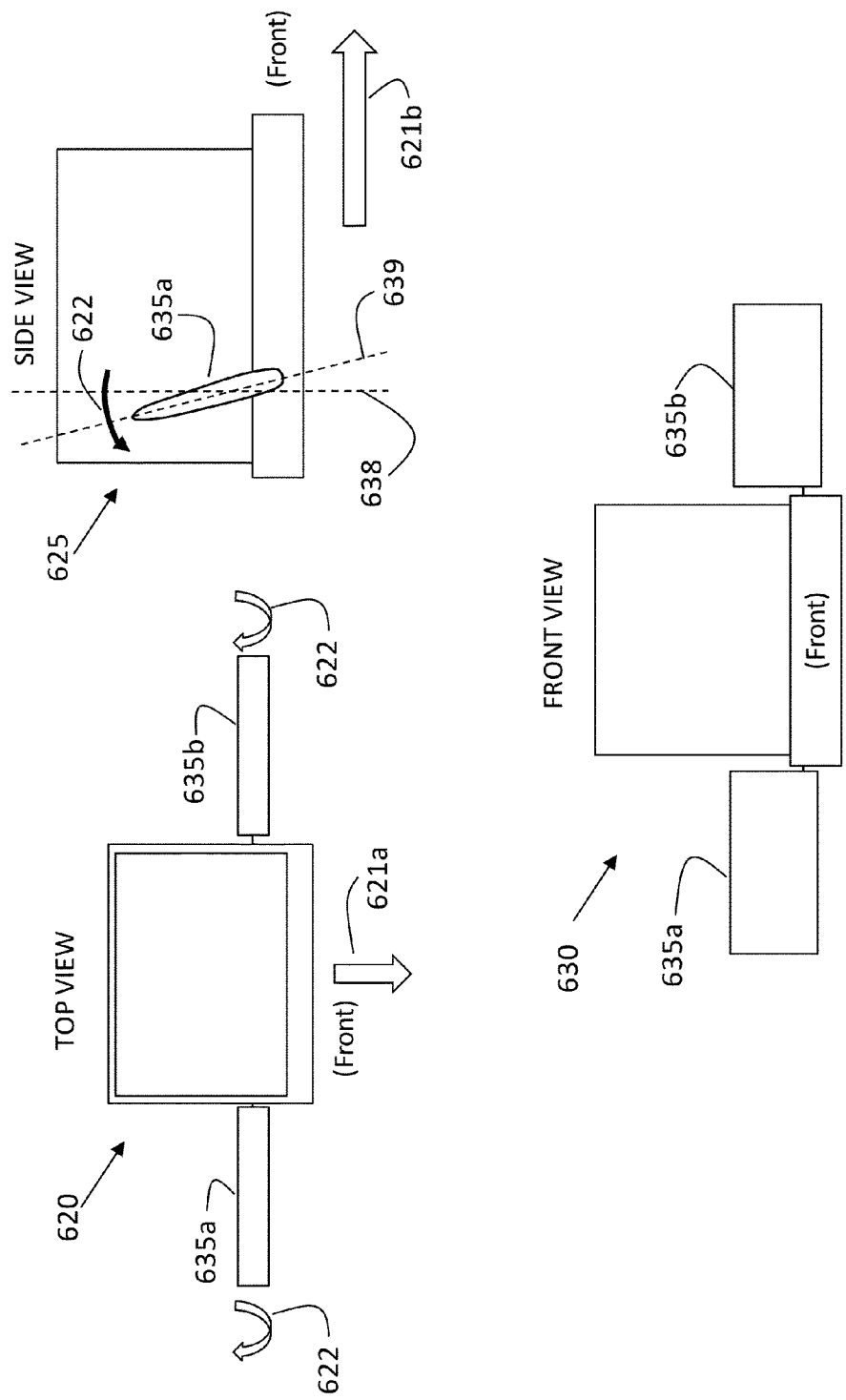

Turning to FIG. 6B, the respective top view 620, side view 625, and front view 630 are seen. In this embodiment, both fins 635a, 635b are rotated slightly. Specifically referring to the side view 625, it can be seen that the fin 635a is rotated backwards 622. Because the CDS bundle is descending rapidly, a lateral force 621b propels the CDS bundle in a lateral direction, specifically in a forward direction. The rotated fins 635a, 635b are also seen in the top view 620 with both fins rotated in the same direction 622. The lateral force 621a from the top view is illustrated as well. The front view 630 also illustrates both fins 635a, 635b.

This configuration of the fins is used to move the CDS bundle forward. The fins could be moved both in the other direction to move the CDS bundle backward. Once the FMC determines which direction (if any), the CDS bundle needs to be steered in, this fin configuration shown in FIG. 6B can be used to laterally move the CDS bundle to the center of the airdrop cone.

Figure 6C:
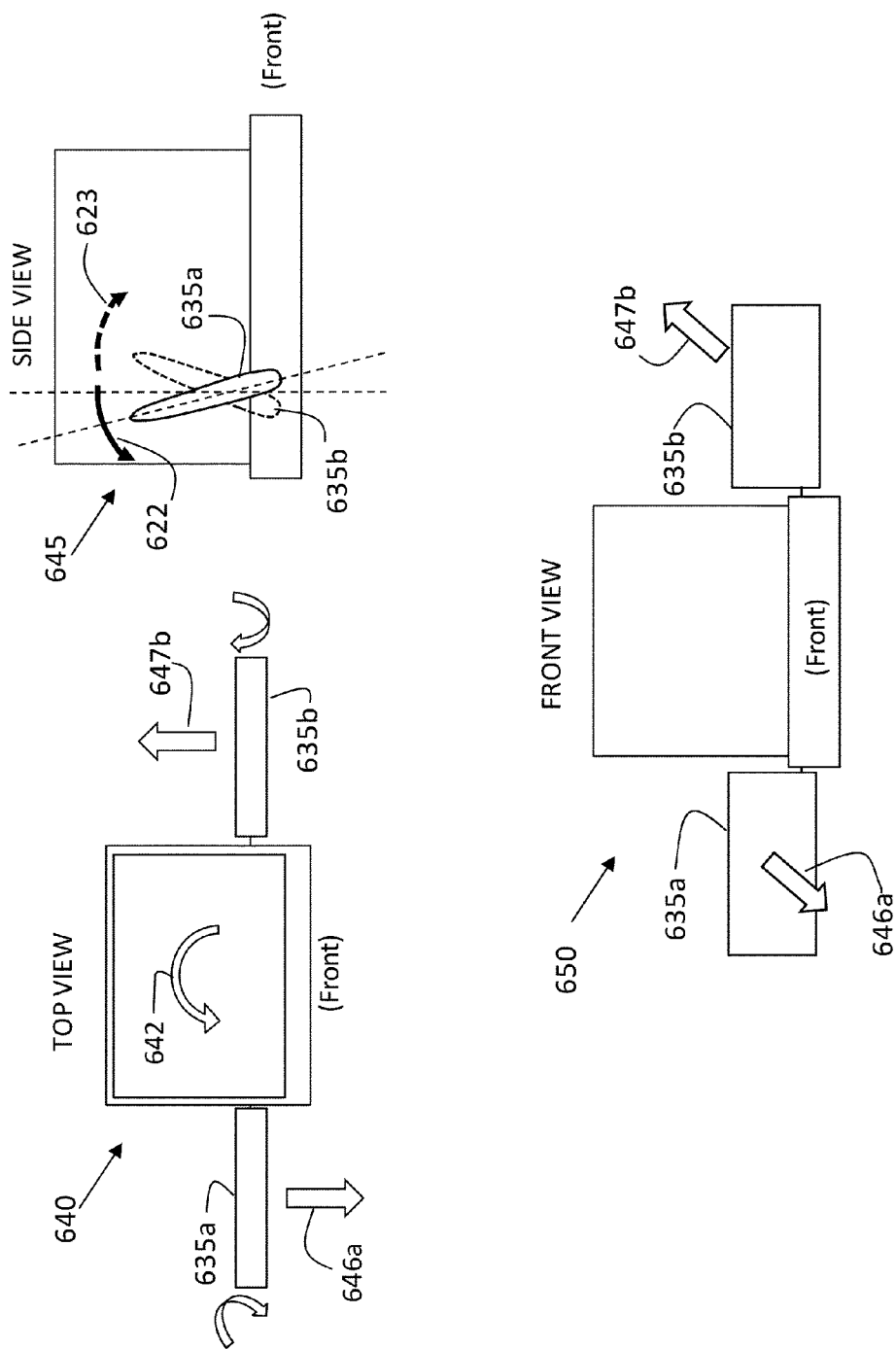

Turning now to FIG. 6C, this illustrates how the direction of the CDS bundle can be changed by rotating it about its axis during descent. The top view 640 shows that one fin 635a is rotated in one direction, and the other fin 635b is rotated in the other direction. This causes a forward force 646a and a backwards force 647a to be exerted on each respective fin resulting in a rotational force 642 about the center axis.

The fin rotation in opposite directions can be appreciated in the side view 645, where the fin 635a is shown rotating in a backwards direction 622. The other fin, normally, not seen from the side view, is shown using dotted lines 635b and rotated forward 623. Finally, the front view 650 also shows a forward force 646a on fin 635a and a backwards force 647b on fin 635b.

Thus, the CDS bundle can be rotated left or right during descent by the FMC counter-rotating the fins during descent so that the front (whichever side that may be defined as) is pointed in a particular heading. In many cases during descent, the CDS bundle is pointed into the crosswind to provide better control. By counter-rotating the fins as describe above in conjunction with FIG. 6C, the FMC can orient the CDS bundle in a particular direction. Then using the fin configuration in FIG. 6B, the FMC can steer the CDS bundle so as to maintain a vector to the target drop location.

Figure 6D:
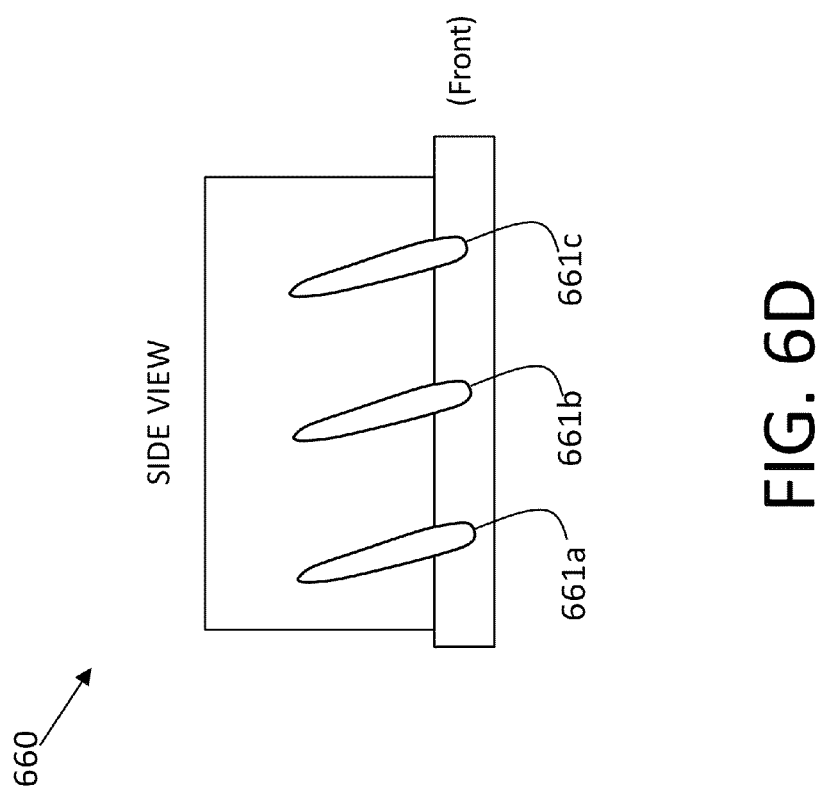

FIG. 6D illustrates another embodiment of fin placement. In this embodiment, only a side view 660 is shown. This illustrates that multiple fins 661a, 661b, and 661c, specifically three can be attached to each side of the pallet to provide additional control. The number and size of the fins can vary based on the size of the load, and the amount of control required. Specifically, other embodiments may use two or four fins per side.

FIGS. 7A and 7B illustrate a perspective view 700 and a cross sectional view 750 respectively of the inflatable fin. Referring to FIG. 7A, the fin comprises an outer layer 705 which encases a series of inflated cylindrical structures 710a-710d (collectively referred to as 710 and referred to a "cylinder") that can be made in one embodiment of ripstop nylon. In other embodiments, the ripstop nylon can be Mylar® coated to contain the introduced pressurized gas. Each cylinder 710a-710d has a respective inflation tube 715a-715d (collectively referred to as 715). The tubes 715 connect to a manifold tube 720, which in turn connects to the pivot tube 725. The pivot tube 725 is attached to the fin attachment point 325, which allows the fin to be inflated and rotated about an axis. The cylinders 710 are inflated to approximately 4 pounds/square inch.

The cross sectional view 750 of FIG. 7B shows how the outer layer 705 encases the series of cylinders 710 to create the fin. In various embodiments there can be more or less cylinders, and of different relative diameters. It is not necessary that the cross sectional shape have a conventional airfoil shape. It is sufficient if the fins are symmetrical, since it is not necessary to create a pressure differential on the fin surfaces. The area 755 between the cylinders 710 is not pressurized and remains at the atmospheric pressure.

The inflatable fin can be made of ripstop nylon, or other similar materials known to those skilled in the art. Other configurations are possible. For example, a single inflating tube 715 could be used provided there are other passages created to allow the pressurized gas to enter all the various cylinders 710. Other embodiments may dispense with the cylinders and rely on internal baffles to create a suitable profile and shape of the fin.

Other embodiments may use rigid fins constructed of sheet metal and internal ribs, similar to conventional wing manufacturing techniques. The fins can be installed prior to airdrop. In other embodiments, these rigid fins may be hinged at the point of attachment to the platform layer so that they can fold up prior to being airdropped. Other configurations could stow the fins in a vertical position adjacent to the pallet, and extend the fins after deployment. Those skilled in the art will recognize that there are various ways in which steerable fins could be configured to steer the CDS bundle, and the principles and concepts disclosed herein can apply to these techniques using non-inflatable fins.

Figure 8:
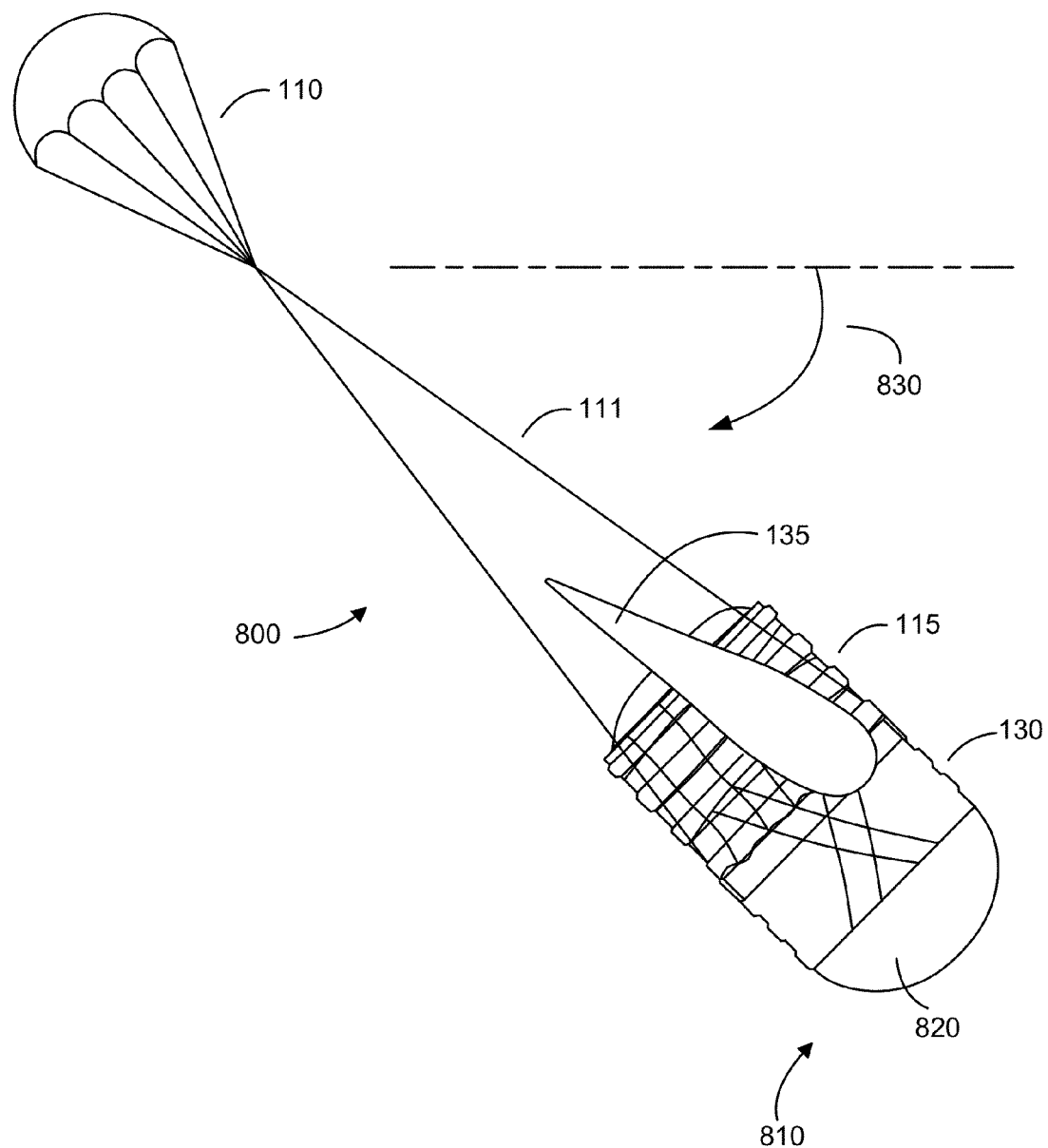
FIG. 8 illustrates one embodiment of a steerable container delivery system according to one embodiment disclosed herein.

Turning now to FIG. 8, there is illustrated yet another embodiment of a steerable CDS system 800. In addition to some or all of the elements of the steerable CDS system 100 described above, the steerable CDS system 800 includes a range extension device 810 in the form of a CDS fairing 820. Elements of the steerable CDS system 800 that are similar to those elements otherwise illustrated and described above are similarly labeled without further description.

While in descent, the glide slope angle 830 of some steerable CDS system embodiments may be from approximately 90° to approximately 60°, with a cross range of approximately 1 km to approximately 4 km. One advantage of the range extension device 810 is to decrease drag, which can reduce the glide slope angle 830 and increase the range of flight. Accordingly, while in descent the glide slope angle 830 of some steerable CDS system embodiments with a range extension device 810 may be from approximately 60° to approximately 30°, with a range approximately 4 km to 10 km. Further, in descent the range of other steerable CDS system embodiments with other range extension embodiments may be greater than 10 km.

FIG. 9A illustrates an embodiment of a fairing pattern 910 that may be used to construct the CDS fairing 820, best shown in FIG. 9B. The illustrated fairing pattern 910, approximately 4'×4' square, may be a sheet of ripstop nylon material similar to that used to construct the fin structures 135. The fairing pattern 910 includes a first axis 915 spanning opposite corners together with arched attachment lines 915a, and a second axis 920 spanning adjacent opposite corners together with arched attachment lines 920a.

To construct the CDS fairing 820 the fairing pattern 910 may be folded along an axis 915, 920 and a Mylar seal (not shown) applied along the outside of that folded edge. The fairing pattern 910 and Mylar seal are then attached along the attachment lines 915a, 920a associated with that folded edge, using suitable methods as described herein. The fairing pattern 910 may be then folded along the other axis 915, 920 and a Mylar seal (not shown) applied along the outside of that folded edge. In alternative embodiments the Mylar seal is applied along the inside of the folded edges. The fairing pattern 910 and Mylar seal are then attached along the attachment lines 915a, 920a, using suitable methods as described herein. The excess material, that is, the material located between the folded edge of each axis 915, 920 and its respective attachment lines 915a, 920a may be removed.

As shown in FIG. 9B, the illustrated CDS fairing 820 is constructed into the general shape of a bulbous nose. Other CDS fairing embodiments may take other configurations that reduce drag, such as but not limited to parabolas, spherical or semi-spherical shapes, bulleted or arched shapes, elliptical or oval shapes, angular shapes, combinations thereof, and the like. Other CDS fairing embodiments may use other fairing patterns, methods of sealing and attaching, methods of assembly and connecting, and materials to create other embodiments of a range extension device 810 as described herein.

With reference now to FIG. 9C, there is shown an exploded view of a range extension device 810. The components of the range extension device 810 comprise the CDS fairing 820, a fairing base 930 that includes a base aperture 932, a base collar 934, and a collar top 936 that includes a top aperture 940. Here, the illustrated fairing base 930 is a 4'×4' square of material, the base aperture 932 has a diameter of approximately 6", the base collar 934 is a 6"×19" strip of material with connected ends, and the collar top is a 6" diameter sheet of material with a top aperture 940 large enough to pass a range extension filler tube 942. The fairing base 930, base collar 934, and collar top 936 may be ripstop nylon or comparable material, similar to that used to construct the CDS fairing 820 and fin structures 135. The illustrated range extension device 810 may be constructed according to the methods described herein, and stowed in the pallet 130 to be deployed, also as described herein.

Regarding methods of attaching or connecting the various components to construct the illustrated range extension device 810, the base collar 934 is attached to the fairing base 930 such that the base collar 934 surrounds the base aperture 932. The CDS fairing 820 is positioned on the side of the fairing base 930 opposite the base collar 934, and the perimeter of the CDS fairing 820 is attached to the perimeter of the fairing base 930 together with a Mylar seal (not shown) on the outside of the perimeter. In this embodiment the perimeter of the CDS fairing 820 and the fairing base 930 are both approximately 4'×4' square.

Seam sealer is applied to all joints and connections between the base collar 934 and fairing base 930, and CDS fairing 820 and fairing base 930. The CDS fairing 820 is then pulled through the base collar 934 so that the CDS fairing 820 is right-side out with the Mylar seal (not shown) on the inside of the perimeter joint between the CDS fairing 820 and fairing base 930. The collar top 936 is attached to the end of the base collar 934, opposite the fairing base 930, together with a Mylar seal (not shown) on the inside of the joint between the collar top 936 and base collar 934. Seam sealer is applied to this joint between the collar top 936 and base collar 934. The collar top 936 is attached within a range extension housing 950 and a range extension filler tube 942, originating from the payload platform 131, is inserted through the top aperture 940 and fixably secured to allow inflating and deploying of the range extension device 810, as described below.

Figure 10A:
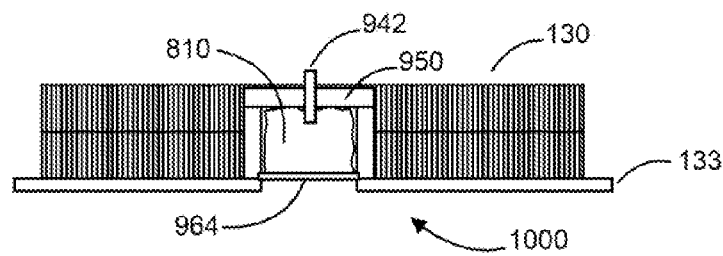
FIGS. 10A-10C illustrate various views of a steerable container delivery system in various configuration according to embodiments disclosed herein.

With reference now also to FIG. 10A, there is shown a range extension device 810 in a stowed configuration 1000 within the range extension housing 950. In the illustrated embodiment the range extension housing 950 is located within the crushable layers 132, and is configured to receive and stow the collapsed range extension device 810. Access to the interior of the range extension housing 950, for purposes such as attaching and stowing a collapsed range extension device 810, may be provided through a skid aperture 960 in the skid 133. With the collar top 936 and base collar 934 positioned within the range extension housing 950, the CDS fairing 820 and fairing base 930 may be evacuated and retracted into a stowed configuration 1000. A range extension cover 964 (best shown in FIG. 10B) in the form of a frangible piece of material, such as plastic, is attached to the skid 133 to cover the stowed range extension device 810.

The various components of the range extension device 810 may be attached or connected by suitable mechanical, chemical, or electrical methods, such as but not limited to gluing, welding, bonding, sewing, sealing, riveting, stitching, combinations thereof and the like. Attaching or connecting the various components may include attaching the edges of the components with a Mylar seal on one side of each connected edge and seam sealer on the opposite side of each connected edge. As used herein, the terms "attach" and "connect," together with all their respective derivatives, are used interchangeably and expansively to include any method that joins respective components to construct an embodiment of a range extension device 810. Further, as used herein, directional terms such as inside, outside, right-side, up, down, combinations thereof and the like, are used descriptively merely for purposes of orientation and teaching, and not as limitations.

Turning fully now to FIG. 10A, the range extension filler tube 942 is positioned to direct compressed gas from the payload platform 131 into the range extension device 810, similar to the method described to inflate the fins 135. As described above with reference to FIG. 4, the payload platform 131 houses a pressurized gas cylinder 415 which contains, for example, pressurized nitrogen or carbon dioxide gas that is released by a regulator 413 through a hose 416 to a filler tube 430, which provides the gas to the fins 135. This same filler tube 430 may provide gas to the range extension device 810 through the range extension filler tube 942. In some embodiments the same gas cylinder 415 provides gas to the fins 135 and range extension device 810, while in other embodiments a plurality of gas cylinders 415 may provide gas to the fins 135 and range extension device 810, while in still other embodiments separate gas cylinders 415 separately supply gas to the fins 135 and range extension device 810. Accordingly, the range extension filler tube 942 may originate from the hose 416, the filler tube 430, or a regulator 413 fitted to a gas cylinder 415.

Figure 10B:
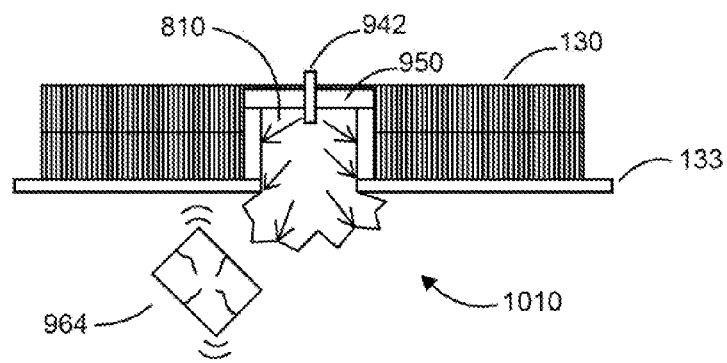

FIG. 10B shows a range extension device 810 in an inflating configuration 1010. Gas from the range extension filler tube 942 is released into the stowed range extension device 810, which begins to pressurize and inflate. The inflating range extension device 810 ruptures the range extension cover 964, and the CDS fairing 820 expands beyond the range extension housing 950.

Figure 10C:
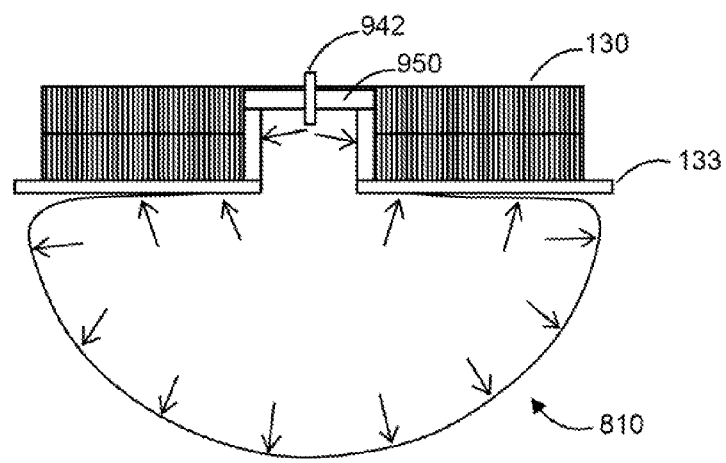

FIG. 10C shows a fully inflated and deployed range extension device 810. Because the range extension device 810, together with the fins 135, may be inflated at a high altitude where air pressure is low the range extension device 810 needs to be constantly inflated with gas as the CDS bundle 115 descends in order to maintain a constant air pressure in the range extension device 810. As the CDS bundle 115 descends the outside air pressure increases. The regulator 413 is actuated to release compressed gas upon command from the FMC 420 and thereafter regulates a steady stream of gas to keep the range extension device 810 inflated. The range extension device 810 is crushed and destroyed on landing, but may serve to further cushion the CDS bundle 115 on landing.

Alternative embodiments of the range extension device 810 are contemplated depending, in part, on the configuration of the CDS fairing 820. For example, a plurality of substantially circular CDS fairings 820 may be located on the exterior of the CDS bundle 115, such as to the sides of the crushable layers 132 or to the exterior face of the skid 133. In other embodiments, one or more CDS fairings 820 that are substantially cylindrical are located and positioned to deploy from opposite edges of the CDS bundle 115. These alternative embodiments may be stowed within a compartment or housing located within or otherwise attached to the CDS bundle 115. In still other embodiments the CDS fairing 820 is narrower than the skid 133, while in other embodiments one or more CDS fairings 820 expand and extend beyond the perimeter of the skid 133. Other embodiments include combinations of the embodiments described, and the like.

Figure 11:
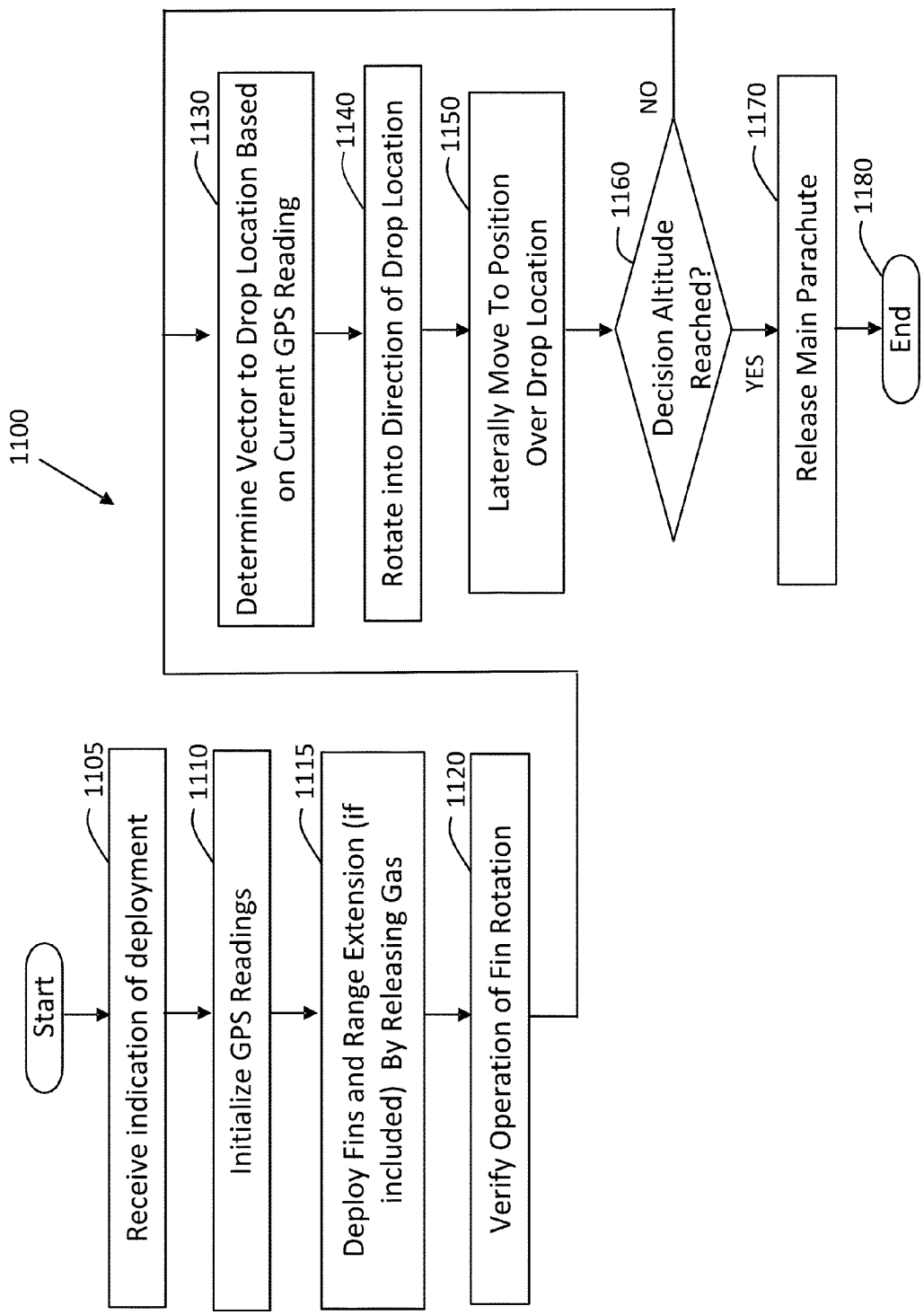
FIG. 11 illustrates a process flow of the flight management computer according to one embodiment disclosed herein.

One embodiment of the operations performed by the FMC is shown in FIG. 11. FIG. 11 shows various operations performed by the FMC beginning with deployment from the aircraft to release of the main parachute. The FMC is typically powered-on and activated prior to deployment by the loadmaster of the cargo aircraft. This may involve physically turning ON the FMC and wirelessly downloading various parameters, such as the drop location coordinates, weight of the CDS container, and current GPS coordinates.

The process begins in FIG. 11 in operation 1105 when the CDS bundle exits the aircraft. In one embodiment, a wire is connected to the CDS bundle to the aircraft so that when the CDS bundle exits the aircraft, the wire is pulled out from the CDS bundle and informs the FMC that the CDS bundle is in free fall. Contemporaneously with this deployment, the drogue parachute is deployed. Although the CDS bundle is in free fall, it is oriented properly so that the bottom of the pallet is largely facing down.

In operation 1110, the FMC then obtains initial GPS readings using the aforementioned GPS card. Although the FMC may have been programmed with the latest GPS coordinates while on the aircraft, the FMC must be able to acquire its own readings, which should be similar to the latest GPS coordinates stored in memory.

In operation 1115, the FMC deploys the fins by releasing gas from the fin pressurization tank. The FMC sends a signal to an actuator that punctuates a seal on the pressure tank, releasing gas. A regulator or some other metering mechanism ensures that gas from the pressure tank is metered out at a controlled rate, since the fins must be constantly pressurized during descent. Within a few seconds from the beginning of pressurization, the fins are typically deployed.

In some embodiments the FMC simultaneously deploys the range extension device by releasing gas from the fin pressurization tank. A regulator or some other metering mechanism ensures that gas from the pressure tank is metered out at a controlled rate, since the range extension device must be constantly pressurized during descent. In some embodiments the FMC deploys the range extension device before or after the fins as described below, the distinctions in those embodiments being the timing or sequencing of the fins and range extension device. Within a few seconds from the beginning of pressurization, the range extension device is typically deployed.

In operation 1120, the FMC verifies the operational status of the fins. This can be accomplished by various means, including relying on sensors that report a change in rotational angle of each fin in response to the FMC sending a command to rotate each fin. Alternatively, the use of sensors can be avoided by the FMC initiating certain steering maneuvers and verifying that appropriate changes are noted. For example, by counter-rotating the fins, the CDS bundle should rotate. This could be detected by a compass 550, as discussed above. In another example, if both fins are rotated in the same direction, then a lateral movement should be detected based on the GPS location. Alternatively, counter-rotation of the fins will cause the CDS bundle to rotate, which can be detected by using the compass. Application of Parameter Identification (PID) software during the initial free-fall will allow the FMC to estimate the roll inertia and any aerodynamic corrections for the CDS bundle as it was configured by the riggers. Measured changes from the theoretical inertia, based on CDS bundle weight, and baseline aerodynamics can be used to update the control law gains before steering of the CDS bundle is initiated. Other techniques including adaptive control strategies can be used to determine the relative sensitivity of the fins. The relative sensitivity of the fins for controlling movement of the CDS bundle varies on the size of the fins and the inertia of the cargo, wind speeds, etc.

In operation 1130, the FMC uses the current GPS coordinates and the GPS coordinates of the target drop location to calculate a vector to steer the CDS bundle. Typically, the initial GPS coordinates when deployed from the aircraft will be close to the target drop location GPS coordinates, but typically they will not be directly over the GPS target drop location. Hence, there will be offset to some degree that requires the FMC to steer the bundle as needed. Steering to the drop location is accomplished in operation 1140 by rotating the CDS bundle into the direction of the drop location, and then in operation 1150 laterally moving towards the drop location.

Figure 12:
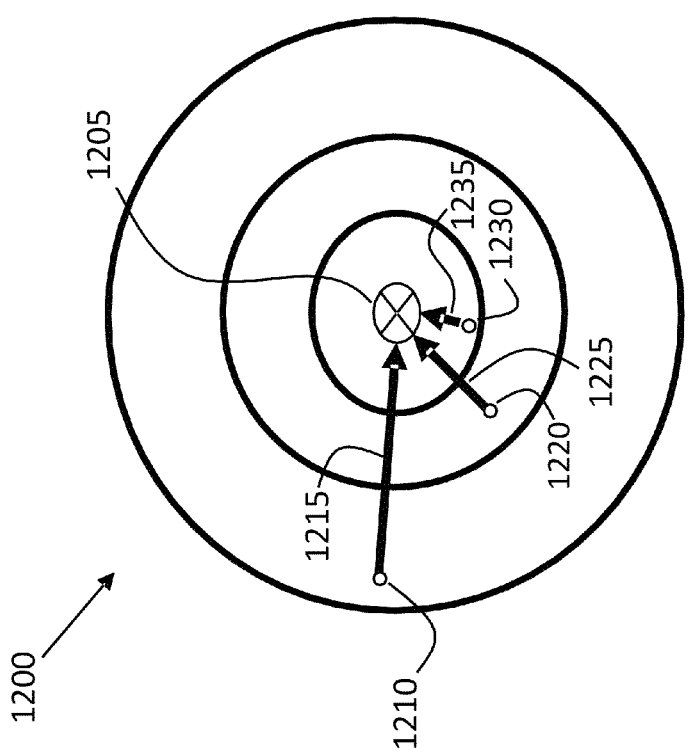
FIG. 12 illustrates vectors used to steer the container delivery system bundle according to one embodiment disclosed herein.

FIG. 12 illustrates the concept of developing and updating a vector to steer the CDS bundle to the drop location. In FIG. 12, a series of concentric rings 1200 can be defined with the drop location 1205 in the center. This can be visualized as the airdrop cone as viewed from above. Location 1210 may represent the GPS latitude and longitude coordinates of the CDS bundle when initially deployed from the aircraft. Location 1205 represents the GPS longitude and latitude coordinates of the drop location. Hence, the FMC knows its current relative position with respect to the drop location 1205 coordinates. The FMC calculates the vector 1215 that indicates the direction and distance necessary to place the CDS bundle over the drop location 1205. By orienting the CDS bundle in the appropriate direction (namely, the direction of the vector 1215), and then steering the CDS bundle in a forward direction (e.g., the direction it is pointed in), the bundle will change its position.

It is possible that the CDS bundle may not perfectly respond to fin control. This may be due to the PID control algorithm not yet having established effective feedback, or external lateral winds impacting the lateral position of the CDS bundle, etc. The CDS bundle may move closer to the center, but may be positioned at the next point, point 1220. At this updated point, the new vector 1225 to reach the drop location 1205 is calculated by the FMS, and the CDS bundle is steered according to that vector. In the next measurement location 1230, a third closer location is achieved, and a new vector 1235 is calculated. Various algorithms can be employed to ascertain the effectiveness of the control for moving the bundle, and this can be used to estimate wind speed, which the FMC can then compensate for.

When the FMC initially steers the CDS bundle (which is at a relative high altitude) the FMC will typically attempt to steer to the center of the drop cone as quickly as possible. Once the CDS bundle centered over the drop location, the steering is mainly to maintain the centered position.

In some embodiments, based on information of prevailing winds at the point of deployment of the main chute, the FMC may adjust the target coordinates to accommodate for drift once the main parachute is deployed. Once the main parachute is deployed, the speed of descent reduces, and this reduces the control ability of the fins. However, targeting the CDS bundle to the original program drop location coordinates independent of wind conditions at the altitude where the main parachute is deployed will still place the CDS bundle in a drop location that is more accurate than if no steering was employed at all.

Returning to FIG. 11, in operation 1160, the FMC computer tests whether the altitude has reached the decision altitude—e.g., the point at which the main parachute is deployed. If not, then the process loops back to operation 1130 where the current location is used to determine an (updated) vector to the drop location. Once the decision altitude 1160 is reached, then in operation 1170 the main parachute is deployed.

In one embodiment, the FMC processing is largely completed at point 1180 once the main parachute it deployed. In other embodiments, the FMC can continue to perform operations 1130, 1140, and 1150 to steer the CDS bundle after the main parachute is opened, but the ability to control the CDS bundle is diminished.

Those skilled in the art will recognize that the concepts and technology presented herein can be embodied in various ways. The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

The invention claimed is:

1. A steerable container delivery system ("CDS") comprising:
    a pallet configured to be airdropped from a cargo aircraft,
    a pallet steering mechanism configured to alter a lateral position of the pallet during descent of the CDS;
    a range extension device configured to deploy and decrease aerodynamic drag associated with the pallet during descent of the CDS; and a flight management computer ("FMC") configured to control the pallet steering mechanism and the deployment of the range extension device.

2. The steerable CDS of claim 1, wherein the pallet comprises a payload platform sub-layer and the pallet steering mechanism comprises a first fin and a second fin configured to rotate about an axis parallel to the pallet at the payload platform sub-layer.

3. The steerable CDS of claim 2, wherein the first fin and the second fin and the range extension device are inflatable.

4. The steerable CDS of claim 3, further comprising at least one tank containing compressed gas configured to release the compressed gas to inflate the first fin and inflate the second fin and inflate the range extension device.

5. The steerable CDS of claim 3, wherein the first inflatable fin and the second inflatable fin are configured to be counter-rotated during descent to rotate the pallet during descent.

6. The steerable CDS of claim 3, wherein at least one of the fins and range extension device comprise a plurality of inflatable structures.

7. The steerable CDS of claim 1, wherein the pallet comprises a payload platform sub-layer housing the FMC and a crushable material sub-layer housing a stowed range extension device.

8. The steerable CDS of claim 7, wherein the FMC comprises a compass, and the compass is used to compute the vector to a second GPS location.

9. The steerable CDS of claim 1, wherein the FMC computer is configured to:
   ascertain a first GPS location using the GPS receiver and compute a vector to a second GPS location, wherein the second GPS location is stored in a memory and is the drop location; and
   position the CDS over the second GPS location.

10. A steerable container delivery system ("CDS") comprising:
   a pallet configured to be airdropped from a cargo aircraft,
   a pallet steering mechanism configured to alter a lateral position of the pallet during descent of the CDS;
   at least one actuator configured to control the pallet steering mechanism;
   a range extension device configured to deploy and decrease aerodynamic drag associated with the CDS during descent; and
   a flight management computer ("FMC") configured to control the pallet steering mechanism so as to steer the CDS to a drop location, wherein the FMC comprises:
      a memory storing GPS coordinates of the drop location,
      a wireless interface for receiving the GPS coordinates of the drop location,
      a GPS receiver configured to receive GPS signals and provide a longitude and latitude of the CDS during descent, and
      a compass providing a heading of the CDS during descent.

11. The steerable CDS of claim 10, wherein the pallet steering mechanism further comprises a first inflatable fin and a second inflatable fin, and further comprising:
   at least one pressurized gas tank configured to release pressurized gas to inflate the inflatable fins and the range extension device.

12. The steerable CDS of claim 11, wherein the first fin and the second fin each are configured so that a respective maximum pressure generated by the first fin and second fin is above a center of gravity of the steerable CDS.

13. The steerable CDS of claim 12, wherein the first fin and the second fin and the range extension device each comprise at least one inflatable structure comprising ripstop nylon.

14. The steerable CDS of claim 12, wherein the pallet comprises a payload platform sub-layer and at least one crushable material sub-layer with the payload platform sub-layer housing the FMC and the crushable material sub-layer housing a stowed range extension device.

15. The steerable CDS of claim 10, wherein the pallet steering mechanism is configured to rotate about an axis positioned horizontal to the pallet.

16. The steerable CDS of claim 15, wherein the FMC is configured to control the actuator so as to steer the CDS to the drop location by both rotating and laterally moving the CDS to the drop location.

17. A method for controlling the descent of an airdropped container delivery system ("CDS"), comprising:
   deploying a CDS comprising a pallet and cargo by ejecting the CDS out of a cargo aircraft;
   deploying a pallet steering mechanism;
   deploying a range extension device from at least one side of the CDS, and
   controlling the pallet steering mechanism to steer the CDS to a drop location.

18. The method of claim 17, further comprising:
   actuating at least one regulator to release pressurized gas inflating the pallet steering mechanism and the range extension device during descent.

19. The method of claim 17, further comprising:
   ascertaining a first GPS longitude and latitude position of the CDS during descent by a flight management computer controlling the pallet steering mechanism; and
   controlling the pallet steering mechanism so as to position the CDS closer to a second longitude and a second latitude associated with the drop location.

20. The method of claim 17, wherein deploying a range extension device comprises inflating a stowed range extension device.

* * * * *